(12) United States Patent
Luo

(10) Patent No.: US 11,708,117 B2
(45) Date of Patent: Jul. 25, 2023

(54) FUNCTION ARRANGEMENT FOR INSTALLATION AROUND VEHICLE WHEEL FENDER

(71) Applicant: Xing Wen Luo, City of Industry, CA (US)

(72) Inventor: Xing Wen Luo, City of Industry, CA (US)

( * ) Notice: Subject to any disclaimer, the term of this patent is extended or adjusted under 35 U.S.C. 154(b) by 316 days.

(21) Appl. No.: 17/136,320

(22) Filed: Dec. 29, 2020

(65) Prior Publication Data

US 2022/0144345 A1 May 12, 2022

Related U.S. Application Data

(60) Provisional application No. 63/113,109, filed on Nov. 12, 2020.

(51) Int. Cl.
| | | |
|---|---|---|
| *B62D 25/18* | (2006.01) | |
| *B60R 7/00* | (2006.01) | |
| *B60N 3/10* | (2006.01) | |

(52) U.S. Cl.
CPC .............. *B62D 25/182* (2013.01); *B60R 7/00* (2013.01); *B60N 3/104* (2013.01)

(58) Field of Classification Search
CPC .......... B62D 25/182; B60R 7/00; B60N 3/104
See application file for complete search history.

(56) References Cited

U.S. PATENT DOCUMENTS

| | | | | |
|---|---|---|---|---|
| 3,245,713 | A * | 4/1966 | Ogilvie ..................... | B60P 3/00 296/37.6 |
| 3,326,595 | A * | 6/1967 | Ogilvie ..................... | B60R 9/02 224/404 |
| 3,492,042 | A * | 1/1970 | Nachtigall, Jr. ...... | B62D 63/061 296/26.02 |
| 3,722,946 | A * | 3/1973 | Cary ........................ | B60P 3/32 224/543 |
| D238,350 | S * | 1/1976 | John ............................ | D12/98 |
| 4,113,149 | A * | 9/1978 | Harsch ...................... | A45F 3/16 222/181.3 |
| 4,126,349 | A * | 11/1978 | Nelson ................... | B62D 33/02 224/404 |
| 4,135,761 | A * | 1/1979 | Ward ........................ | B60R 9/02 29/434 |
| 4,632,446 | A * | 12/1986 | Douglass ............ | E05B 65/0003 292/205 |

(Continued)

FOREIGN PATENT DOCUMENTS

| | | | | |
|---|---|---|---|---|
| WO | WO-9903719 A1 | * | 1/1999 | .............. B60J 10/00 |
| WO | WO-03024743 A2 | * | 3/2003 | .............. B60R 9/02 |

*Primary Examiner* — Hilary L Gutman
(74) *Attorney, Agent, or Firm* — Raymond Y. Chan; David and Raymond Patent Firm

(57) ABSTRACT

A vehicle function arrangement for a vehicle includes a fender frame and a utility unit. The fender frame is adapted for attaching to a vehicle wheel position of the vehicle, wherein the fender frame has a sideward extension surface arranged for outwardly extending from the vehicle wheel frame. The utility unit is provided at the sideward extension surface of the fender frame for creating an additional utility space for the vehicle. In one embodiment, the vehicle function arrangement is installed to the vehicle wheel frame by fastening the fender frame of the vehicle function arrangement to the vehicle wheel frame.

17 Claims, 42 Drawing Sheets

(56) References Cited

U.S. PATENT DOCUMENTS

| | | | | |
|---|---|---|---|---|
| 4,685,695 | A * | 8/1987 | LeVee | B62D 53/0828 296/37.6 |
| 5,567,000 | A * | 10/1996 | Clare | B60R 11/06 296/183.1 |
| 5,706,991 | A * | 1/1998 | Stewart | B60R 11/06 206/349 |
| 5,819,390 | A * | 10/1998 | Clare | B62D 33/02 29/430 |
| 6,030,018 | A * | 2/2000 | Clare | B60J 10/24 224/404 |
| 6,033,002 | A * | 3/2000 | Clare | B60J 10/00 296/183.1 |
| 6,105,231 | A * | 8/2000 | Clare | B60R 11/06 29/469 |
| 6,237,211 | B1 * | 5/2001 | Clare | B60R 11/06 29/469 |
| 7,431,368 | B2 * | 10/2008 | Henderson | B62D 33/0273 296/37.6 |
| 7,686,365 | B2 * | 3/2010 | Thelen | B60R 9/00 296/181.3 |
| 8,573,671 | B2 * | 11/2013 | Watkins | B60R 11/06 296/37.8 |
| 9,126,535 | B1 * | 9/2015 | Moore | B62D 25/168 |
| 9,193,290 | B2 * | 11/2015 | Lazarevich | B60P 3/14 |
| 10,239,470 | B2 * | 3/2019 | Loew | B60R 11/06 |
| 2012/0256438 | A1 * | 10/2012 | Watkins | B60R 11/06 296/37.6 |
| 2021/0229606 | A1 * | 7/2021 | Zitting | B60R 11/06 |

\* cited by examiner

FUNCTION ARRANGEMENT FOR INSTALLATION AROUND VEHICLE WHEEL FENDER

CROSS REFERENCE OF RELATED APPLICATION

This is a non-provisional application that claims priority to U.S. provisional application, application No. 63/113,109, filed Nov. 12, 2020, which is incorporated herewith by reference in its entirety.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to vehicles, and more particularly to a function arrangement for installation around vehicle wheel fender, which is adapted to be installed to a vehicle wheel frame for not only serving as a wheel guard to prevent detritus flying up from the road but also providing desired functions such as easy accessible storages and other functional accessories.

Description of Related Arts

Utility vehicles, such as trucks, cargo van, truck, pickup truck, sport utility vehicle (SUV), and all-terrain vehicle (ATV), often transport both people, goods, tools, cargo, and the like, such that the available cargo space of the vehicle has been reduced. The cargo to be carried may exceed the available cargo space of the vehicle. For outdoor recreational activities, such as hunting or camping, as an example, tents, sleeping bags, chairs, water containers, and other bulky items are often carried in the limited cargo space of the vehicle. It is desirable to provide various areas for temporary storage of items. Vehicle manufacturers offer many different types of exterior storage arrangement installed into the vehicle.

A first common storage arrangement is a roof rack installed on a roof of the vehicle. The bulky or heavy cargo, such as luggage, skis and bicycle, can be fastened at the roof rack on top of the vehicle. However, this roof rack is designed to carry only specific types of larger object. In addition, even though this roof rack can well serve for storing items, it is difficult for the driver to reach the roof rack for loading and unloading the items at the roof rack anytime or anywhere for some handy items. The driver is required to climb up the roof of the vehicle to access the items carried or fasten the items thereon.

A second common storage arrangement is a rear storage device installed at the rear end of the vehicle. Accordingly, an attachment or adapter is required for installing the rear storage device to the vehicle, wherein such attachment is not designed to support substantial loads. Generally, the rear storage device is mostly used to carry spare tire. In other words, the heavy items are not suggested to be loaded in the rear storage device. Since the rear storage device is installed at the rear end of the vehicle behind the cargo space thereof, the rear storage device may block the access of the cargo space. Furthermore, the rear storage device is intended to permanently attach to the vehicle to enhance the rigid support of the rear storage. It is impractical and expensive to permanently install the rear storage device to limit the access of the cargo storage of the vehicle.

Generally, these utility vehicles are constructed to have a pair of front wheel fenders and a pair of rear wheel fenders installed around the front wheels and the rear wheels respectively as vehicle wheel frames or guards to prevent detritus flying up from the road and protect the wheel tires from contacting with objects sidewardly. It is to the provision of the vehicle to enhance the storage ability thereof by modifying spatial positions around the vehicle wheel fender so as to provide additional functions thereof.

SUMMARY OF THE PRESENT INVENTION

The invention is advantageous in that it provides a vehicle function arrangement, which is adapted to be installed at one or more positions around a vehicle wheel fender that not only forms a vehicle wheel frame serving as a guard to prevent detritus flying up from the road, but also provides predetermined functions such as easy accessible storages and other functional accessories.

Another advantage of the invention is to provide a function arrangement for installation around a vehicle wheel fender, which provides multiple functions for the vehicle without limiting the cargo space thereof.

Another advantage of the invention is to provide a function arrangement for installation around a vehicle wheel fender, wherein one or more utility storage modules, such as liquid containers or toolboxes, are provided for temporary storage of items in an organized manner.

Another advantage of the invention is to provide a function arrangement for installation around a vehicle wheel fender, which comprises a step platform for the user standing thereon to access the cargo space or the roof of the vehicle or stepping thereon for ease of getting into the utility vehicle.

Another advantage of the invention is to provide a function arrangement for installation around a vehicle wheel fender, which comprises a fender adapter arrangement installed around a wheel of the utility vehicle for quickly fastening any item, such as storage container, utility tool, handy item, bag, or luggage, at the side of the vehicle.

Another advantage of the invention is to provide a function arrangement which is a replacement of the conventional fender of the vehicle to provide an added function therefor while functioning as a wheel fender.

Another advantage of the invention is to provide a function arrangement for installation around a vehicle wheel fender, wherein the installation of the function arrangement is simple and easy by mounting to the surrounding rim of the vehicle wheel frame.

Another advantage of the invention is to provide a function arrangement for installation around a vehicle wheel fender, wherein the installation of the function arrangement is simple and easy by attaching at the side of the vehicle wheel frame.

Another advantage of the invention is to provide a function arrangement for installation around a vehicle wheel fender, which can be easily removed from the vehicle by simply unfastening the bolts to restore the original appearance of the vehicle.

Another advantage of the present invention is to provide a function arrangement for installation around a vehicle wheel fender, which does not require to alter the original structural design of the vehicle, so as to minimize the manufacturing cost of the vehicle incorporating with the vehicle wheel fender.

Another advantage of the present invention is to provide a utility vehicle which has built-in with at least a pair of function arrangements as wheel fenders installed around two rear wheels on the sides of the utility vehicle.

Another advantage of the present invention is to provide a function arrangement for installation around a vehicle wheel fender, wherein no expensive or complicated structure is required to employ in the present invention in order to achieve the above mentioned advantages.

Additional advantages and features of the invention will become apparent from the description which follows and may be realized by means of the instrumentalities and combinations particular point out in the appended claims.

According to the present invention, the foregoing and other objects and advantages are attained by a function arrangement for installation around a wheel on a side of a vehicle, comprising:

a fender frame configured to be mounted to a vehicle wheel frame around the wheel of the vehicle, wherein the fender frame has a sideward extension surface arranged for outwardly extending from the side of the vehicle around the wheel; and at least one utility unit provided at the sideward extension surface of the fender frame for creating at least an additional utility space for the vehicle.

In one embodiment, the utility unit comprises one or more utility storage modules which can be integrally built-in with the fender frame or can be detachably coupled at the fender frame.

In one embodiment, the fender frame comprises at least one fender wing adapter to support the utility storage module, wherein the fender wing adapter has an inclined extension portion downwardly extended from a mid-frame and a base supporting portion extended from a bottom end of the inclined extension portion, such that an inclined sidewall and a bottom wall of the utility storage are supported by the inclined extension portion and the base supporting portion of the fender wing adapter respectively.

In one embodiment, the sidewall of the utility storage module has a size and shape matching with the side surface of the fender wing adapter.

In one embodiment, the utility storage module, having an opening, can be embodied as a top utility storage container supported on top of the fender wing adapter or as a side utility storage container supported at a side of the fender wing adapter.

In one embodiment, the utility storage module is embodied as a drawer slidably coupled at the fender wing adapter.

In one embodiment, the utility storage module is embodied as a liquid container, having a top liquid inlet, detachably coupled at the fender wing adapter.

In one embodiment, the liquid container of the utility storage module further has a liquid outlet formed at a bottom side of the utility storage module.

In one embodiment, the utility storage module can be embodied as a thermal insulation box or a mini-refrigerator.

In one embodiment, the fender frame comprises a mid-frame having a flat top surface. In one embodiment, the fender frame further has a plurality of functional slots formed on the flat surface of the mid-frame.

In one embodiment, the function arrangement further comprises at least a light fixing slot provided on at least one of the mid-frame, a front side of the fender wing adapter, a rear side of the fender wing adapter, and a bottom side of the fender wing adapter.

In one embodiment, the mid-frame is integrally extended from the fender wing adapter.

In one embodiment, the function arrangement is constructed to have a barebone frame and a detachable frame detachably coupled at the barebone frame.

In accordance with another aspect of the invention, the present invention provides an installing method of a function arrangement onto a side of a vehicle, which comprises the following steps.

(A) Remove the stock wheel fender from the vehicle wheel frame of the vehicle.

(B) Mount the function arrangement of the present invention to the vehicle wheel frame of the vehicle as a replacement of the stock wheel fender.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIGS. 18-1 to 18-32 are exploded perspective views illustrating different combinations of the fender frame and the utility storage module of the vehicle function arrangement according to the preferred embodiment of the present invention.

FIG. 19 is a perspective view of the fender frame of the vehicle function arrangement according to the preferred embodiment of the present invention, illustrating an inner attachment rim of the fender frame attached to the vehicle wheel frame of the vehicle.

FIG. 20 is a perspective view of the fender frame of the vehicle function arrangement according to the preferred embodiment of the present invention, illustrating a reinforcing holder frame attached to the vehicle wheel frame of the vehicle.

FIG. 21 is a perspective view illustrating the utility storage module being directly held by the reinforcing holder frame to be suspended and supported below the upper edge of the trunk.

FIG. 22 is a perspective view illustrating the utility storage module being directly mounted at the vehicle wheel frame of the vehicle via fasteners.

FIG. 23 is a perspective view illustrating another alternative mode of the vehicle function arrangement according to the preferred embodiment of the present invention, illustrating the utility storage modules mounted at a bottom surface of the fender frame.

FIGS. 24-1 to 24-6 are perspective views illustrating different combinations of the fender frame and the utility storage modules with the handle frame of the vehicle function arrangement according to the preferred embodiment of the present invention.

FIGS. 25-1 to 25-4 are perspective views illustrating different functions of the mid-frame of the vehicle function arrangement according to the preferred embodiment of the present invention.

FIGS. 26-1 to 26-3 are perspective views illustrating different structures of the mid-frame serving as a table frame of the vehicle function arrangement according to the preferred embodiment of the present invention.

FIG. 27 is a perspective view illustrating a two-component type of the vehicle function arrangement according to the preferred embodiment of the present invention.

FIGS. 28-1 to 28-3 are perspective views illustrating alternative modes of the two-component type of the vehicle function arrangement according to the preferred embodiment of the present invention.

FIGS. 29-1 to 29-14 are perspective views illustrating alternative modes of the single-component type of the vehicle function arrangement according to the preferred embodiment of the present invention.

FIG. 30 is a perspective view of an alternative mode of the vehicle function arrangement according to the preferred embodiment of the present invention, illustrating the utility storage modules mounted at the bottom surface of the barebone frame.

FIG. 31 is a perspective view of the vehicle function arrangement mounted at the vehicle wheel frame of the vehicle at the normal position according to the preferred embodiment of the present invention, illustrating the utility storage modules mounted at the bottom surface of the barebone frame.

FIG. 32 is a perspective view of the vehicle function arrangement mounted at the vehicle wheel frame of the vehicle at the raised position according to the preferred embodiment of the present invention, illustrating the utility storage modules mounted at the bottom surface of the barebone frame.

FIGS. 37-1 to 37-5 are perspective view illustrating different configurations of the single-component type of the vehicle function arrangement according to the preferred embodiment of the present invention.

FIGS. 40-1 to 40-4 are perspective views illustrating alternative installing methods of the vehicle function arrangement at the vehicle wheel frame of the vehicle according to the preferred embodiment of the present invention.

FIGS. 41-1 to 41-3 are perspective views illustrating different types of utility storage module according to the preferred embodiment of the present invention.

FIGS. 42-1 and 42-2 are perspective views illustrating the vehicle function arrangement installed at the vehicle wheel frame and located around the wheel position FIGS. 43-1 and 43-2 are perspective views illustrating the vehicle wheel frame of the vehicle for mounting the vehicle function arrangement thereto according to the above preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1, 3, 4, and 42-1 to 44 of the drawings, a vehicle function arrangement 1 for installation around a wheel fender position V10 of a vehicle V according to a preferred embodiment of the present invention is illustrated, wherein the function arrangement 1 comprises a fender frame 10 adapted for installing to a vehicle wheel frame V1 of the vehicle V (as shown in FIGS. 9-11 and 43-1 to 43-2), and a utility unit 20 configured to be provided at the fender frame 10 for creating an additional utility space for the vehicle V. In one embodiment, the vehicle wheel frame V1 is provided at the side wheel fender panel V3 of the vehicle V.

Figure 1:
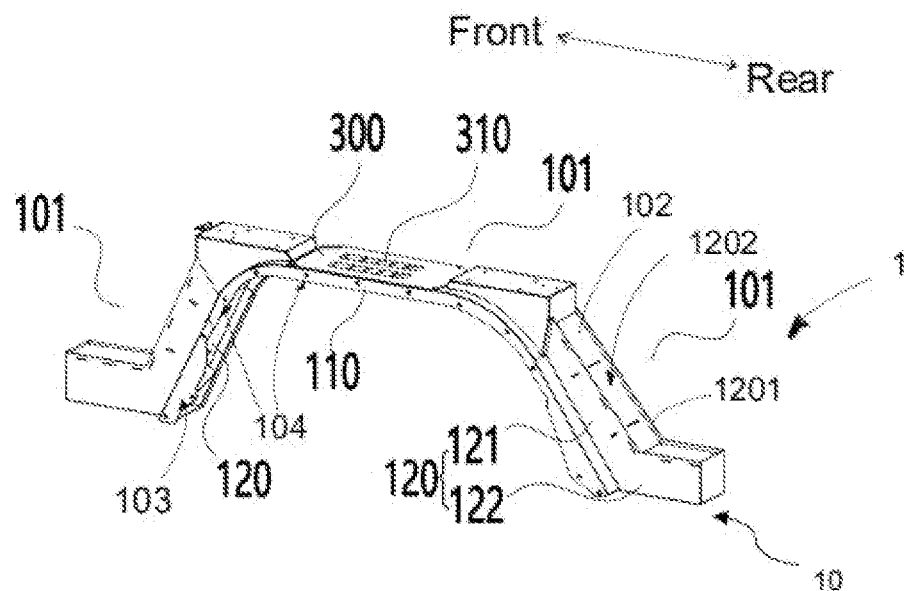
FIG. 1 is a perspective view of a vehicle function arrangement for installation around a vehicle wheel fender according to a preferred embodiment of the present invention.
Figure 9:
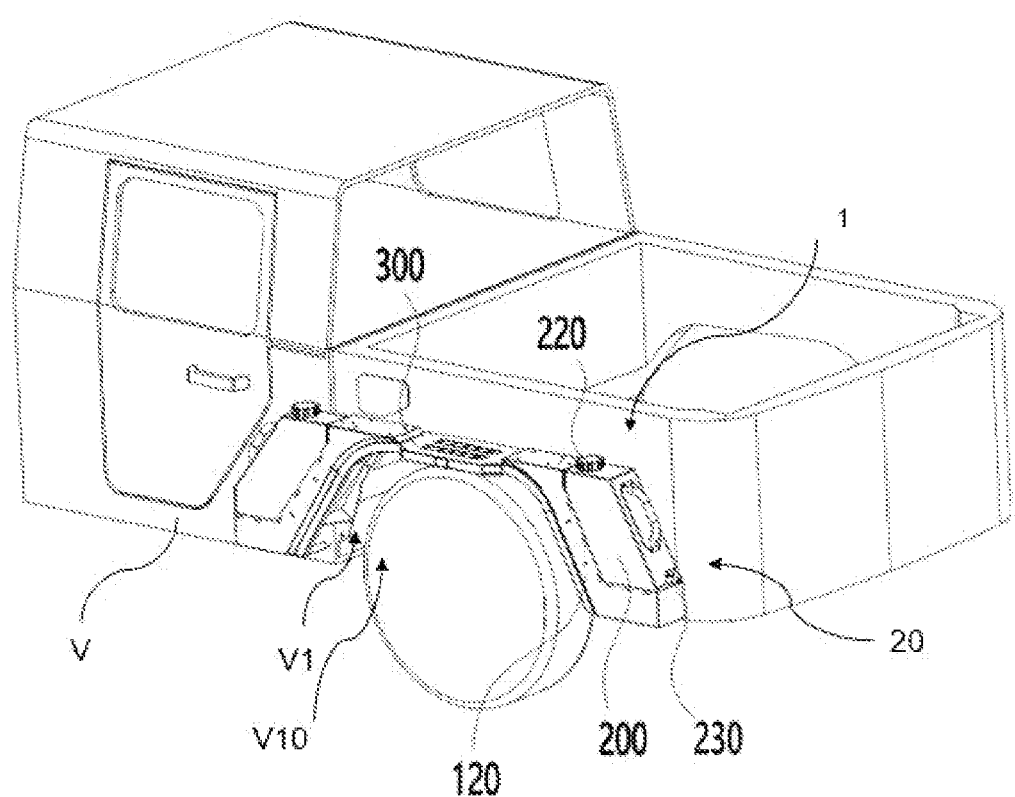
FIG. 9 is a perspective view of the vehicle function arrangement mounted at a vehicle wheel frame of a vehicle at a normal position according to the preferred embodiment of the present invention.

As shown in FIGS. 1, 42-1, 42-2 and 44, the fender frame 10 has one or more sideward extension surfaces 102 arranged for outwardly extending from the vehicle wheel frame V1. Particularly, the fender frame 10 comprises a mid-frame 110 and two fender wing adapters 120 extended opposite from each other to define the one or more sideward extension surfaces 102 at the fender frame 10 (as shown in FIG. 1). In one embodiment, the two fender wing adapters 120 are downwardly extended from two ends of the mid-frame 110 and opposingly positioned at a front position and a rear position of vehicle wheel frame V1, i.e. the front and rear spaces V11, V12 of the wheel fender position V10. The fender fame 10 further comprises a mounting structure 101 provided at the sideward extension surface 102 via at least one of the mid-frame 110 and the fender wing adapters 120 to mount the utility unit 20 securely in position (as shown in FIGS. 1 and 9).

As shown in FIGS. 1, 9, 42-1 and 42-2, as one of the examples, the fender frame 10 is configured to install into the vehicle wheel frame V1, wherein two fender wing adapters 120 are extended from front and rear ends of the mid-frame 110 to form an inverted U-configuration, such that the mid-frame 110 and the fender wing adapters 120 are located above and extended around the wheel position V10 of the vehicle V, for example a rear wheel of the vehicle V.

Figure 2:
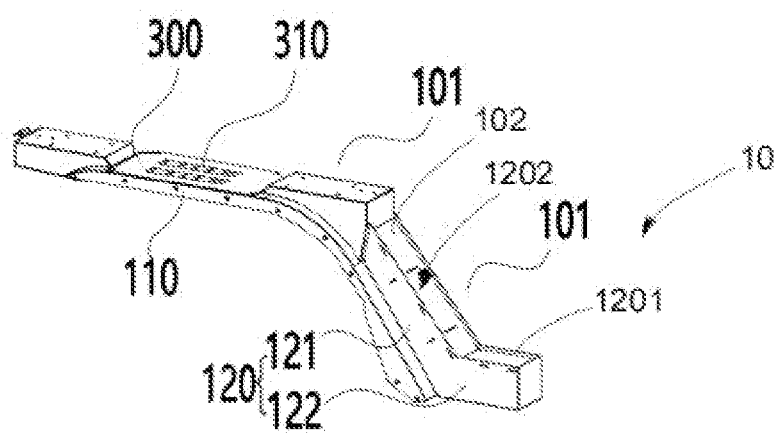
FIG. 2 illustrates an alternative mode of the vehicle function arrangement according to the preferred embodiment of the present invention.
Figure 45:
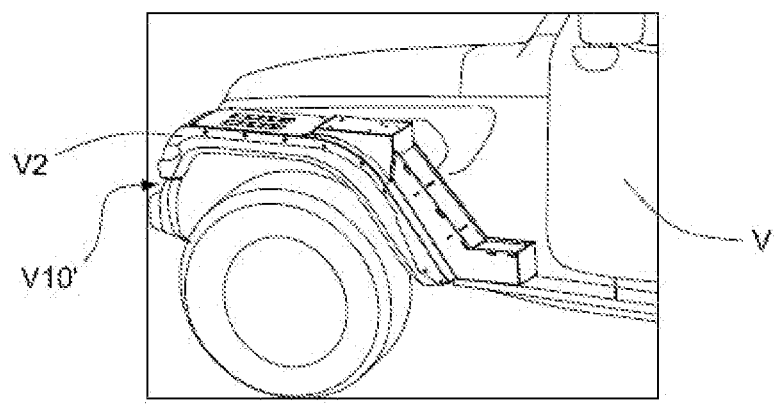
FIG. 45 is a perspective view illustrating the vehicle function arrangement as shown in FIG. 2 adapted to be installed to the front wheel fender of the vehicle according to the above preferred embodiment of the present invention.

As shown in FIG. 2, as another example, the fender frame 10, which is also configured to install into the vehicle wheel frame V1, comprises only one fender wing adapter 120 extended from the rear end of the mid-frame 110 to form a L-configuration, such that the mid-frame 110 is located above the wheel position and the fender wing adapter 120 is rearwardly and downwardly extended around a rear area of the wheel position V10 of the vehicle V, that is especially adapted to be installed to the front wheel position V10' of the vehicle V (as shown in FIG. 45).

Figure 7:
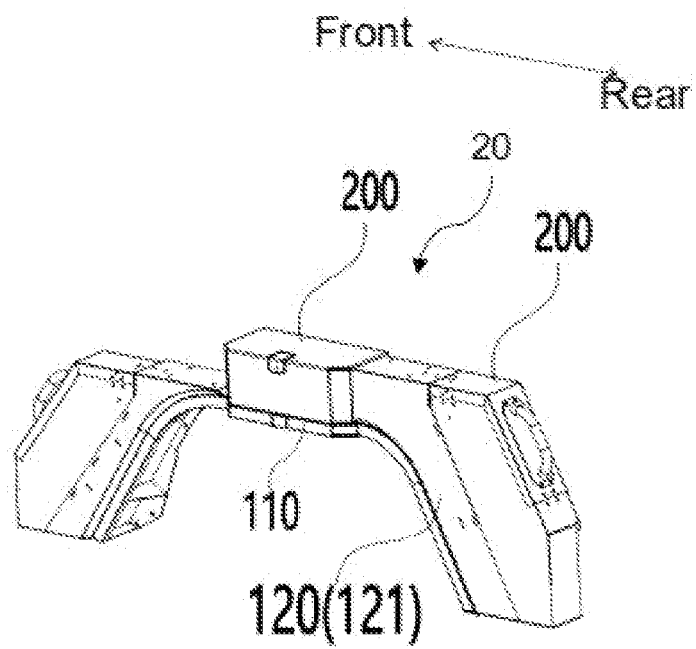
FIG. 7 a perspective view of the vehicle function arrangement according to another alternative mode of the preferred embodiment of the present invention, illustrating another asymmetrically configuration of the fender frame.

It is worth mentioning that the fender wing adapter 120 can be inclinedly and downwardly extended from one end of the mid-frame 110. Alternatively, that the fender wing adapter 120 can be downwardly extended from one end of the mid-frame 110 with a curving configuration to have a curving corner between the mid-frame 110 and the fender wing adapter 120. Likewise, the mid-frame 110 and the fender wing adapter 120 can be modified in different shapes. The two fender wing adapters 120 can be symmetrically or asymmetrically configured. As shown in FIG. 1, the fender wing adapters 120 are symmetrically extended from two ends of the mid-frame 110. As shown in FIG. 7, the fender wing adapters 120 are asymmetrically extended from two ends of the mid-frame 110, wherein a top side of the fender wing adapter 120 extended from the rear end of the mid-frame 110 is located higher than a top side the fender wing adapter 120 extended from the front end of the mid-frame 110. The mounting structure 101 is provided on a top surface of the fender frame 10 as the sideward extension surface 102, wherein the mounting structure 101 is provided on at least one of the mid-frame 110 and the fender wing adapters 120.

Figure 44:
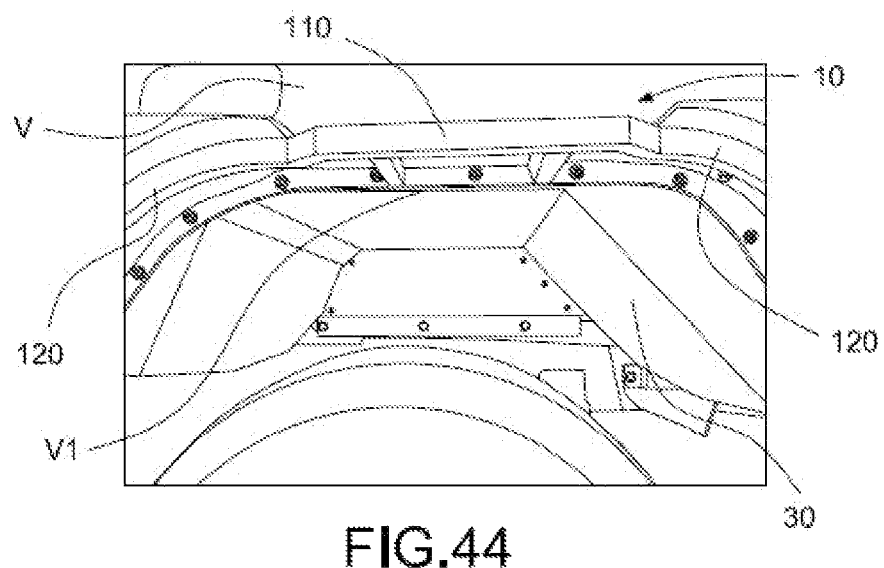
FIG. 44 is an enlarged perspective view illustrating the installation of the fender frame and the inner wheel guard to the vehicle wheel frame of the vehicle according to the above preferred embodiment of the present invention.

After the installation, the fender frame 10 is located above the wheel position V10 of the vehicle V, wherein a bottom surface of the fender frame 10 serves as a mud guard (as shown in FIG. 44). Accordingly, the mounting structure 101 can be any structure such as socket structure, supporting structure, hanging structure, binding structure, or clamping structure, to mount the utility unit 20 on the sideward extension surface 102, wherein the utility unit 20 can be, but not limited to, storage box, toolbox, tool, jack, lighting fixture, fuel tank, water tank, batteries, jacks, refrigerator, detachable thermal insulated and/or refrigerated container, or the like. Therefore, the fender frame 10 creates an additional utility space at the sideward extension surface 102 outwardly extended from the vehicle V and above the wheel so as to make full use of the space V4 above the wheel of the vehicle V.

Referring to FIG. 9, the fender frame 10 is preferred to be built-in and permanently mounted to the vehicle wheel frame V1 so as to install the function arrangement 1 around the vehicle wheel that the fender frame 10 is serving as a wheel fender of the vehicle V while providing additional utility space around the wheel position V10 for storing utility items with the vehicle V, especially those are usually needed by the driver or passengers outside the vehicle V. To current utility vehicle owner, it is also convenience for the user to mount a function arrangement 1 as shown in FIG. 2 to the wheel fender V2 as shown in FIG. 45. It is worth mentioning that a user may also remove the original wheel fender of the vehicle V and install the function arrangement 1 of the present invention to the vehicle wheel frame V1 as described above such that the function arrangement 1 replaces the original wheel fender to function as a utility wheel fender that also provide additional utility function and storage space to install the utility unit 20 thereon.

Figure 3:
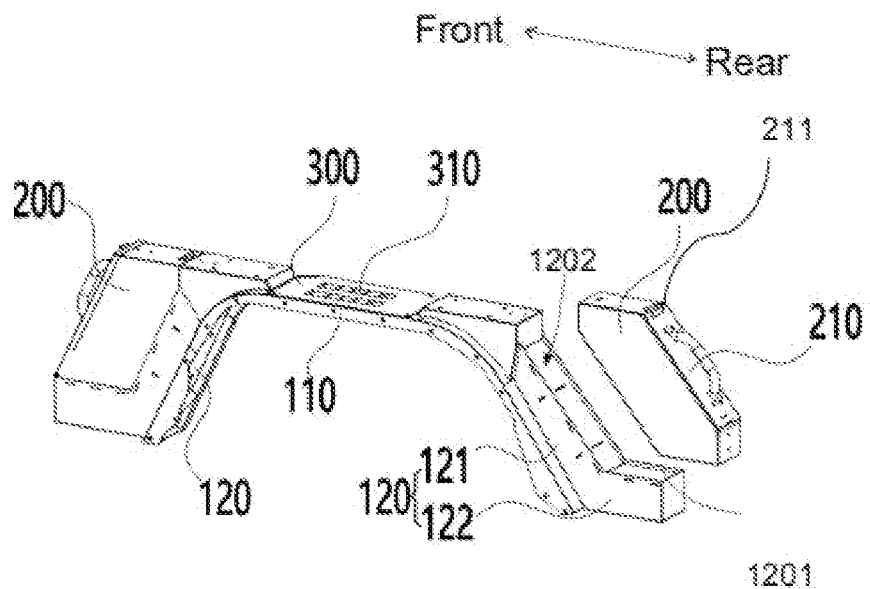
FIG. 3 is a perspective view of the vehicle function arrangement according to the preferred embodiment of the present invention, illustrating a step platform.
Figure 4:
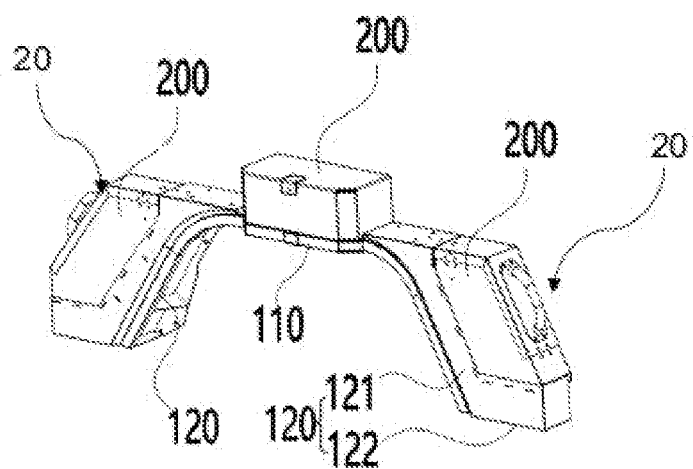
FIG. 4 is a perspective view of the vehicle function arrangement according to the preferred embodiment of the present invention, illustrating a top utility storage.

As shown in FIGS. 3 and 4, the utility unit 20 comprises one or more utility storages 200, such as a storage box, held at the sideward extension surface 102 of the fender frame 10. Particularly, the utility storage 200 can be detachably or permanently mounted at the sideward extension surface 102 by means of the mounting structure 101.

Figure 5:
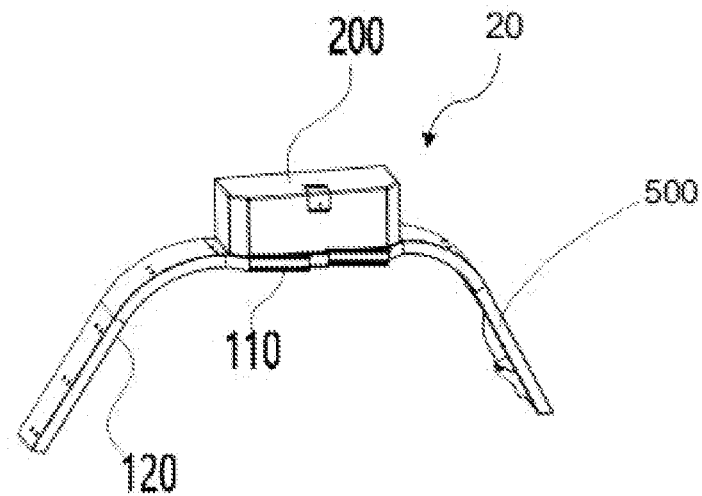
FIG. 5 is a perspective view of the vehicle function arrangement according to another alternative mode of the preferred embodiment of the present invention, illustrating a barebone frame.

As shown in FIG. 3, at least one utility storage 200 is held on one of the fender wing adapters 120 via the mounting structure 101. Preferably, two utility storages 200 are held on the fender wing adapters 120 respectively via the mounting structure 101. Alternatively, as shown in FIG. 5, the utility storage 200 is mounted on the mid-frame 110 via the mounting structure 101. Or, as shown in FIG. 4, two of the utility storages 200 are held on the fender wing adapters 120 respectively while the third utility storage 200 is held on the mid-frame 110. The mounting structure 101 can be a welding structure that the utility storage 200 is permanently mounted on the fender frame 10 via welding. Alternatively, the mounting structure 101 can be the detachable mounting structure, such as fastening slot, a buckle, a hook, or a screw hole, wherein the utility storage 200 is detachably mounted on the fender frame 10. The utility storage 200 can be a storage container for storing items such as tools, a fuel tank, a water tank liquid storage. The function of the utility storage 200 should not be limited as it is mentioned above. According to the preferred embodiment of the present invention, the two utility storage containers 200 mounted to two fender wing adapters 120 as shown in FIGS. 1, 3, 9, 42-1 and 42-2 each has a trapezoid shape so as to also provide a U-configuration for the whole function arrangement 1 matching the fender frame 10, such that two ends of the function arrangement 1 form two opposing inclined surfaces (as shown in FIGS. 9 and 42-1-42-2).

In particular, as shown in FIG. 1, in one embodiment, the fender wing adapter 120 has an inclined extension portion 121 downwardly extended from the mid-frame 110 and a base supporting portion 122 extended from a bottom end of the inclined extension portion 121, wherein the base supporting portion 122 is extended laterally away from the mid-frame 110. In other words, when the fender wing adapter 120 is frontwardly extended from the front end of the mid-frame 110, the base supporting portion 122 is frontwardly extended from the inclined extension portion 121. Likewise, when the fender wing adapter 120 is rearwardly extended from the rear end of the mid-frame 110, the base supporting portion 122 is rearwardly extended from the inclined extension portion 121. The mounting structure 101 can be formed on a top surface of at least one of the inclined extension portion 121 and the base supporting portion 122. The weight of the utility storage 200 is mainly supported by the base supporting portion 122 of the fender wing adapter 120. Accordingly, when the utility storage 200 is mounted at the fender wing adapter 120, a side surface of the utility storage 200 is engaged with the inclined extension portion 121 while a bottom surface of the utility storage 200 is engaged with the base supporting portion 122. In other words, an inclined sidewall and a bottom wall of the utility storage 200 are supported by the inclined extension portion 121 and the base supporting portion 122 of the fender wing adapter 120 respectively.

In one embodiment as shown in FIG. 7, the fender wing adapter 120 does not have the base supporting portion 122, wherein the side surface of the utility storage 200 can be directly mounted at the inclined extension portion 121 in a detachably or permanently mounting manner, such that the bottom surface of the utility storage 200 is exposed and suspended.

Figures 1, 42:
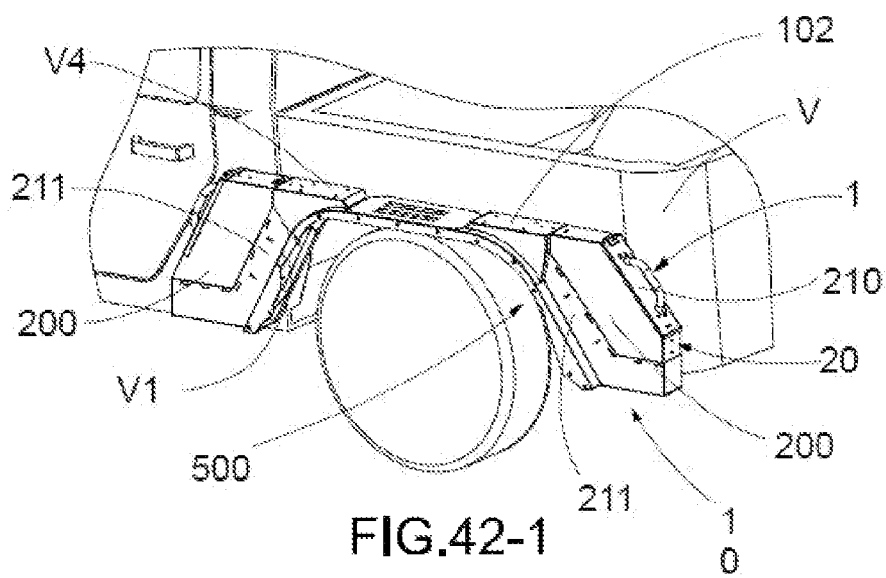
Figures 2, 42:
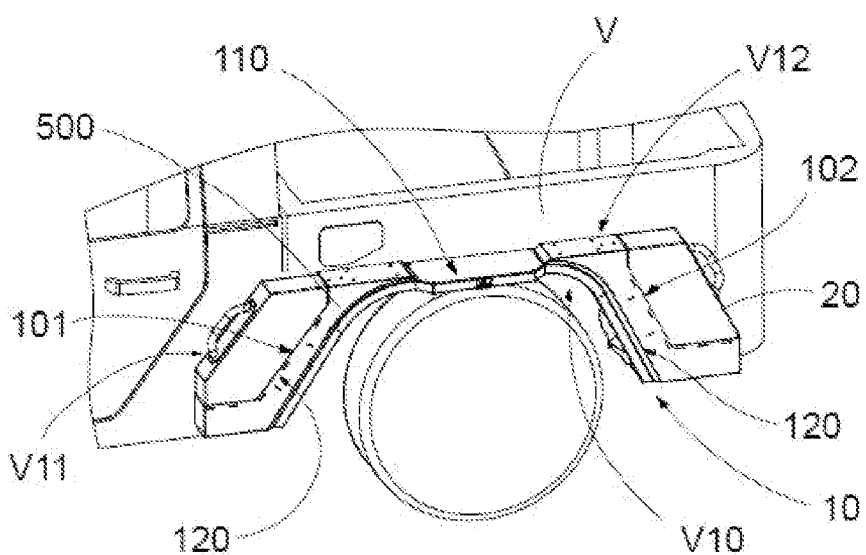

As shown in FIGS. 1 and 3, each of the fender wing adapters 120 has a protruded peripheral edge 1201 defining an indented storage seat 1202 therewith as a socket type mounting structure 101 to retain a portion of the utility storage 200 in position. In other words, the protruded peripheral edge of the fender wing adapter 120 serves as a boundary to ensure the utility storage 200 sat at the indented storage seat 1202 so as to ensure the utility storage 200 being correctly mounted at the fender wing adapter 120. Referring to FIGS. 42-1 and 42-2, a fastening lock 102 is preferred to be provided on a top surface of fender wing adapter 120 for fastening with the utility storage 200 so as to equip with the socket type mounting structure 101 and lock the utility storage 200 in position.

Figures 1, 43:
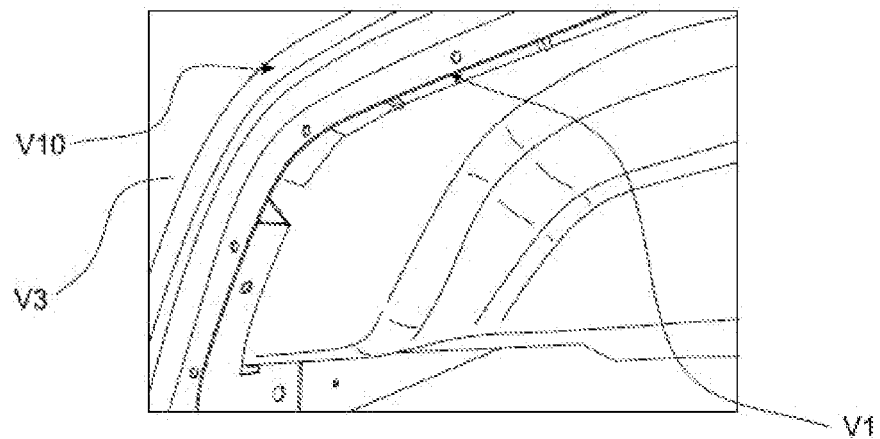
Figures 2, 43:
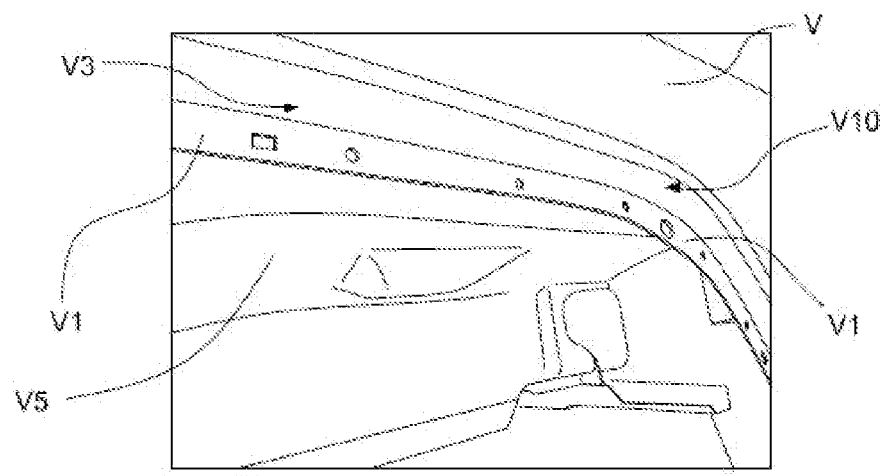

It is worth mentioning that the fender frame 10 is configured to serve as a mud guard when the fender frame 10 is mounted at the vehicle wheel frame V1. Particularly, the inner side of the fender frame 10 is provided as the mud guard. It is worth mentioning that any additional mud guard can be mounted at the inner side of the fender frame 10. As shown in FIG. 44, the function arrangement 1 is preferred to further comprise an inner wheel guard 30 installed at an inner extension portion V5 as shown in FIG. 43-2 to cover and protect the inner vehicle surface from wet mud and dust to avoid rusting.

In one embodiment, as shown in FIG. 3, an inner sidewall of the utility storage 200 is shaped and sized matching with the shape and size of the top surface of the fender wing adapter 120, that is the side extension surface 102 thereof. As shown in FIGS. 1 and 3, the top surface of the fender wing adapter 120 is an inclined surface, wherein the inner sidewall of the utility storage 200 is also an inclined surface, such that the inner sidewall of the utility storage 200 is engaged with the top surface of the fender wing adapter 120 in a surface-to-surface manner so as to ensure the stabilization of the utility storage 200 on the fender wing adapter 120.

As shown in FIGS. 3 and 42-1, the utility storage 200 comprises a storage cover 210 provided at either top or side of the utility storage 200, wherein the storage cover 210 can be opened for exposing a storage cavity of the storage cover 210 and closed for enclosing the storage cavity of the storage cover 210. The storage cover 210 is embodied as a toolbox to store tools such as wrenches, screwdrivers, air pump, jack, hammer, or other handy items that the driver or passengers of the vehicle V may frequently use outside the vehicle V. The tools can be saved in the utility storage 200 when the storage cover 210 is closed and can be reached from the utility storage 200 when the storage cover 210 is opened. It is worth mentioning that the storage cover 210 can be a pivot cover pivotally connected to the utility storage 200 or a sliding cover slidably connected to the utility storage 200. The utility storage 200 is preferred to further comprise a storage lock 211 to lock up the storage cover 210 during its closed condition.

In one embodiment, the utility storage 200 comprises a drawer for storing different items, tools or the like.

In one embodiment as shown in FIG. 9, the utility storage 200 is detachably mounted on top of the fender wing adapter 120, wherein the utility storage 200 is embodied as a liquid container to have a liquid inlet 220 provided at a top side of the liquid container for storing liquid in the utility storage 200. The liquid, such as water, gasoline, etc., can be contained in the utility storage 200, such that the user is able to take out the utility storage 200 from the fender frame 10 for filling or dispensing the liquid from the utility storage 200.

Accordingly, the liquid inlet 220 can be releasably closed by an inlet plug to prevent any liquid leakage when it is in use.

In one embodiment, the utility storage 200 further comprises a liquid outlet 230 formed at a bottom side of the utility storage 200. When the utility storage 200 is filled with water, the liquid outlet 230 can be directly opened for directly dispensing the water without detaching the utility storage 200 from the fender frame 10.

Accordingly, the liquid outlet 230 can be opened or closed via an outlet plug to prevent any liquid leakage when it is in use.

In one embodiment, the utility storage 200 can be embodied as a thermal insulation box or a mini-refrigerator, wherein food or other items can be preserved and refrigerated in the utility storage 200.

Figures 1, 41:
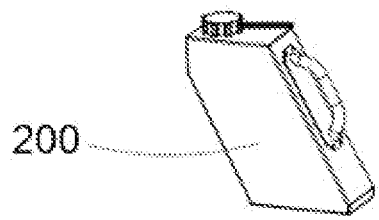
Figures 2, 41:
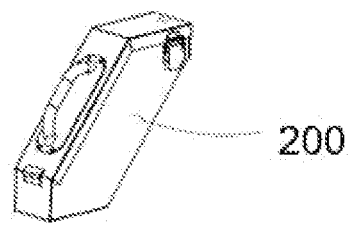
Figures 3, 41:
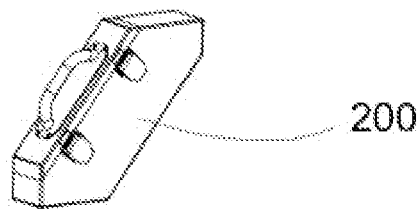

Accordingly, the utility storage 200 is embodied as the liquid container, such as fuel tank or water tank, as shown in FIG. 41-1. The utility storage 200 is embodied as the toolbox or storage box as shown in FIG. 41-2. The utility storage 200 is embodied as the mini-refrigerator as shown in FIG. 41-3.

In one embodiment as shown in FIGS. 1 and 9, a top surface of the mid-frame 110 is a flat surface 300, wherein the flat surface 300 serves as a step platform for the user is climb and reach the roof of the vehicle V and/or a work surface for the user to do some simple job closed to the access of the utility storage 200. It is also convenient for the user to get in or out the vehicle, especially the trunk, by stepping on the flat surface 300 as the step platform.

In one embodiment as shown in FIG. 1, the mid-frame 110 further has a plurality of functional slots 310 formed on the flat surface 300, wherein elongated fasteners, such as ropes, belts, etc., can pass through the functional slots 310 to tighten backpacks, luggage or other items on the flat surface 300. Likewise, the items in the cargo space of the truck can be tightened by passing the ropes or belts through the functional slots 310 of two fender frames 10 at two sides of the truck.

Figure 10:
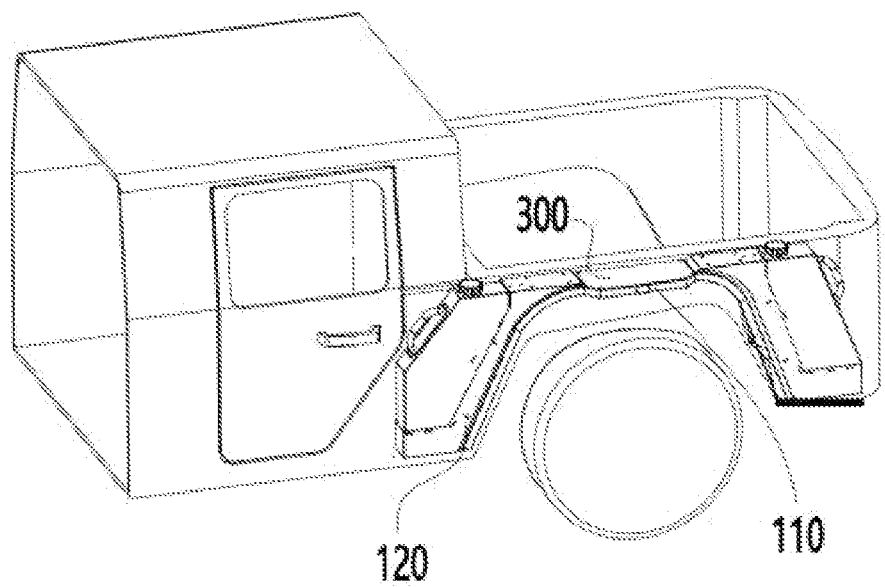
FIG. 10 is a perspective view of the vehicle function arrangement mounted at a vehicle wheel frame of a vehicle at a raised position according to the preferred embodiment of the present invention.

According to different size configurations, the vehicle wheel fender of the present invention can be installed at a normal installation position or at a raised installation position. As shown in FIG. 9, when the vehicle wheel fender is installed into the truck at the normal installation position, the flat surface 300 is lower than the upper edge of the trunk, such that the user is able to step on the flat surface 300 as the step platform to reach the trunk. As shown in FIG. 10, when the vehicle wheel fender is installed into the truck at the raised installation position, the flat surface 300 is aligned with the upper edge of the trunk at the same level, such that the trunk area is enlarged by sidewardly and outwardly expanding the two flat surfaces 300 from two sides of the trunk area of the truck so as to support the items on the flat surfaces 300. It is worth mentioning that the vehicle wheel fender should not be limited between these two positions.

Figure 6:
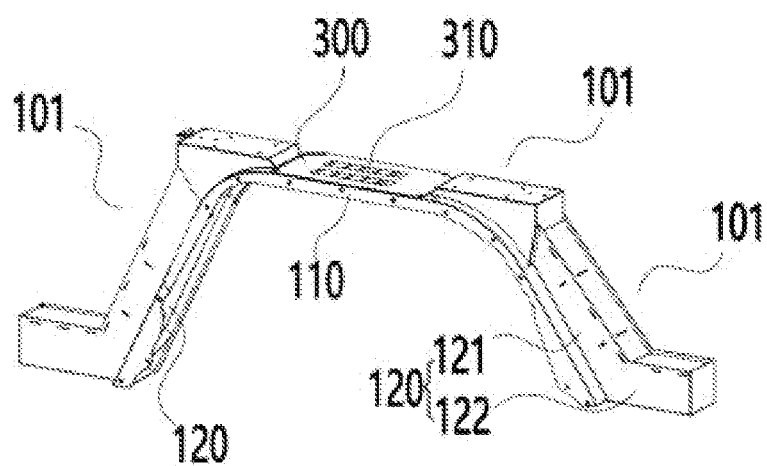
FIG. 6 a perspective view of the vehicle function arrangement according to another alternative mode of the preferred embodiment of the present invention, illustrating an asymmetrically configuration of the fender frame.

As shown in FIG. 6, it is also possible to configure in different heights, wherein a bottom of one of the fender wing adapters 120 is located higher than a bottom of another fender wing adapter 120. For example, the bottom of the rear fender wing adapter 120 is higher than the bottom of the front fender wing adapter 120. In other words, the fender wing adapters 120 have different heights to have the asymmetric configuration for matching with different vehicle sizes.

Figure 11:
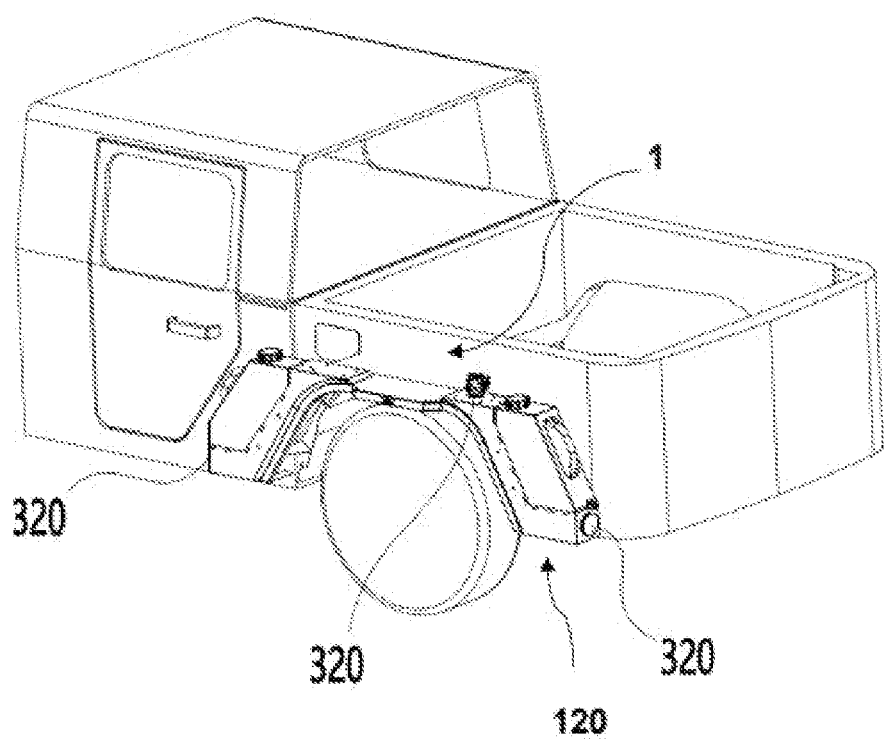
FIG. 11 illustrates an alternative mode of the utility storage module according to the preferred embodiment of the present invention, illustrating the utility storage module as a liquid container.

In one embodiment as shown in FIG. 11, the vehicle function arrangement 1 further comprises at least a lighting fixture or light fixing slot 320 provided on at least one of the mid-frame 110, a front side of the fender wing adapter 120, a rear side of the fender wing adapter 120, and a bottom side of the fender wing adapter 120. The user is able to mount a light fixture, such as an illuminating light, a camp light, a warning light, at the light fixing slot 320 for providing different light effects. It is worth mentioning that a reflector can be coupled at the light fixing slot 320 as well. Other light apparatuses, such as daytime lights, emergency lights or functional lights such as turn signals, can be installed into the light fixing slot 320.

Figure 8:
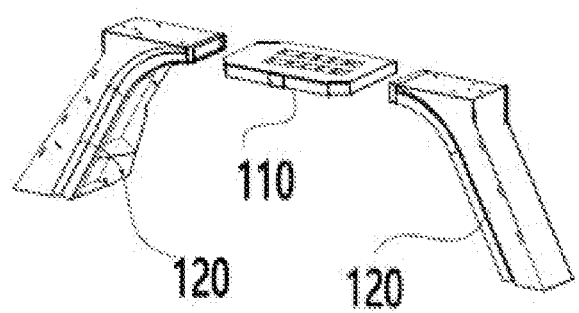
FIG. 8 a perspective view of the vehicle function arrangement according to another alternative mode of the preferred embodiment of the present invention, illustrating a three-component type fender frame.

In one embodiment, the mid-frame 110 can be detachably coupled between the fender wing adapters 120 as three separate components or can be integrally extended between the fender wing adapters 120 as a one-piece integrated fender member. As shown in FIG. 1, the mid-frame 110 is integrally extended between the fender wing adapters 120 as a one-piece integrated fender member. As shown in FIG. 8, the mid-frame 110 can be detachably coupled between the fender wing adapters 120 as three separate components, wherein the mid-frame 110 is detachably coupled to the fender wing adapters 120 via an inserting structure, screwing structure, or the like.

In one embodiment as shown in FIGS. 12, 42-1, 42-2, and 44, the fender frame 10 is constructed to have a barebone frame 500 adapted for attaching to the vehicle wheel frame V1 of the vehicle V and a detectable frame 400 detachably coupled at the barebone frame 500, wherein the mounting structure 101 is provided at the detachable frame 400. The mid-frame 110 and the fender wing adapters 120 are constructed to form the barebone frame 500, wherein the detectable frame 400 is detachably coupled at the barebone frame 500 via screw structure, buckling structure, or the like. Therefore, the user is able to interchange different detachable frames 400 at the barebone frame 500 to provide different functions of the detachable frames 400. In other words, different detachable frames 400 provide different functions.

Accordingly, the fender wing adapter 120 is constructed to have a base wing frame 123 and a unit holder 124. The mid-frame 110 is integrally extended from two base wing frames 123 to form the barebone frame 500, wherein the sideward extension surface 102 is formed on the barebone frame 500. The unit holder 124 is coupled on the base wing frame 123 to hold the utility storage 200 in position.

Figure 12:
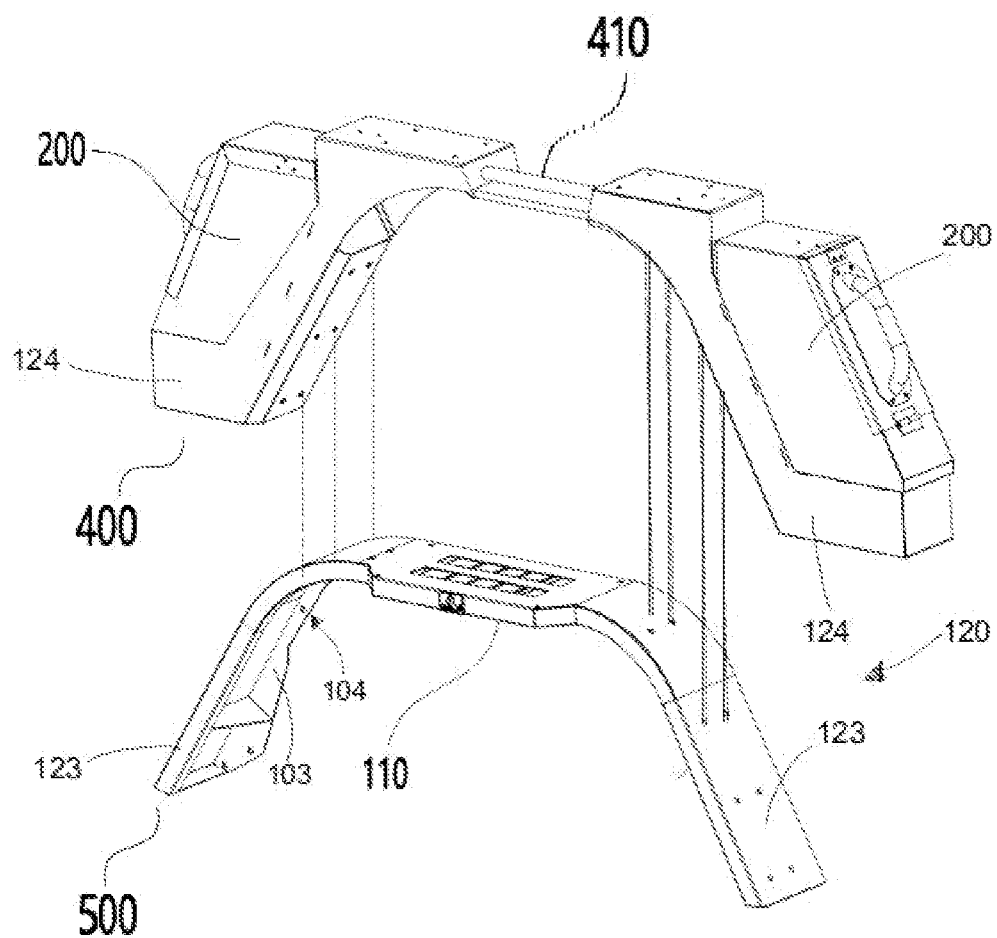
FIG. 12 is an exploded perspective view of another alternative mode of the vehicle function arrangement according to the preferred embodiment of the present invention, illustrating a handle frame.

Furthermore, the detachable frame 400 comprises a handle frame 410 for carrying the detachable frame 400. As shown in FIG. 12, the handle frame 410 is embodied as a handle bar provided on a top side of the detachable frame 400 at the middle thereof, such that the user is able to carry the handle frame 410 to conveniently move the detachable frame 400 place to place. The shape and size of the handle frame 410 can be modified and the location of the handle frame 410 should not be limited in the present invention.

Accordingly, the handle frame 410 is integrally extended between the unit holders 124 to form the detachable frame 400, wherein when the detachable frame 400 is coupled on the barebone frame 500, the handle frame 410 is positioned above and aligned with the mid-frame 110 at the step platform thereof as shown in FIG. 12.

Figure 13:
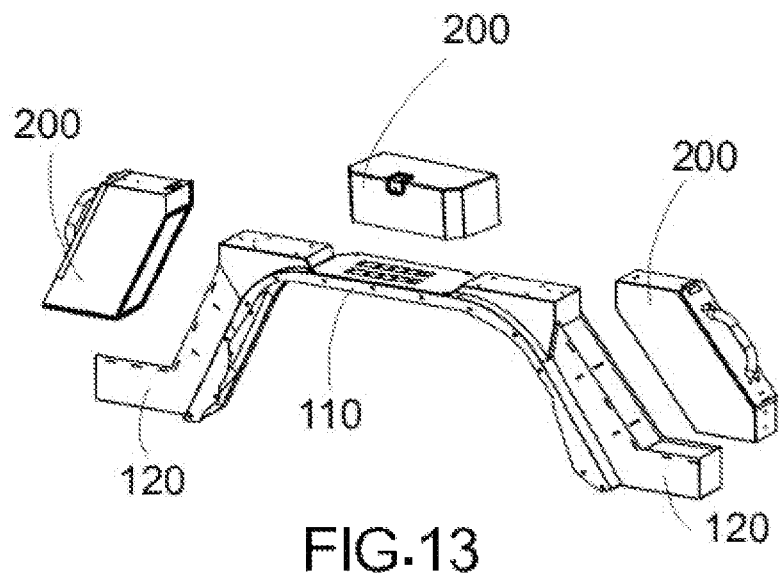
FIG. 13 is an exploded perspective view of the vehicle function arrangement according to the preferred embodiment of the present invention.

FIG. 13 is an exploded perspective view of the vehicle wheel fender, wherein the mid-frame 110 is integrally extended between the fender wing adapters 120 to form a one-piece integrated member. The utility unit 20 comprises three storage units 200, wherein two of the storage units 200 serve as two side storage units detachably coupled at the fender wing adapters 120 respectively while one of the storage units 200 serves as a top storage unit detachable coupled at the mid-frame 110.

Figure 16:
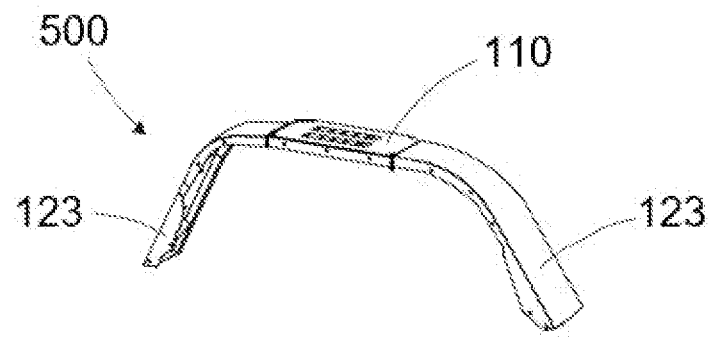
FIG. 16 is a perspective view illustrating the barebone frame of the fender frame according to the preferred embodiment of the present invention.

Particularly, the barebone frame 500 is constructed in a one-piece integrated member, wherein the mid-frame 110 is integrally extended between two base wing frames 123, as shown in FIG. 16. Two ends of the mid-frame 110 are integrally extended at two inner ends of base wing frames 123 respectively.

Figure 14:
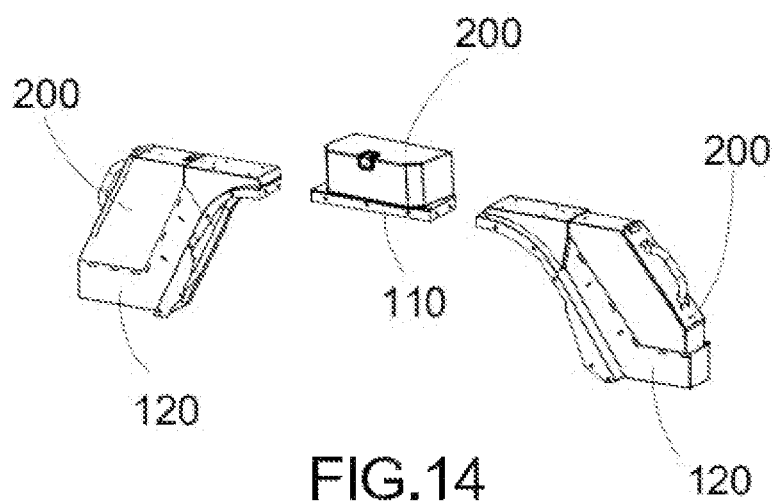
FIG. 14 is an exploded perspective view of another alternative mode of the vehicle function arrangement according to the preferred embodiment of the present invention, illustrating a three-component type fender frame.
Figure 15:
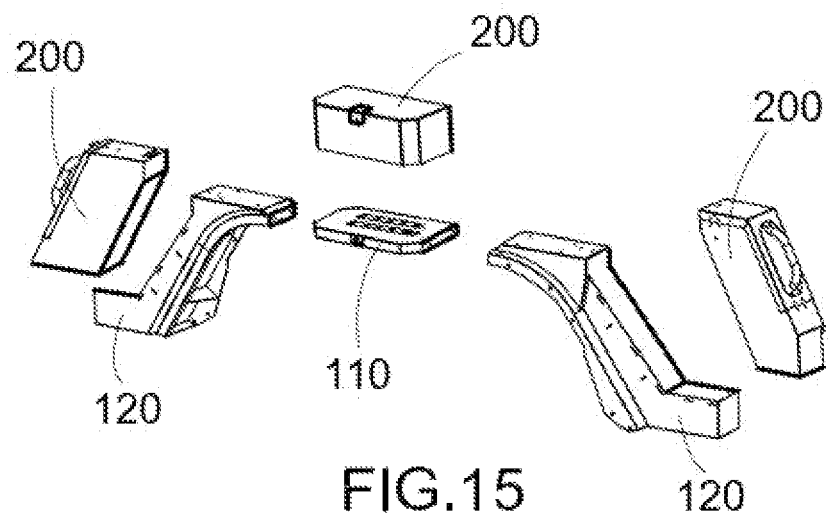
FIG. 15 is an exploded perspective view illustrating the three-component type fender frame according to the preferred embodiment of the present invention.

FIGS. 14 and 15 illustrates alternative mode of the vehicle wheel fender, wherein the mid-frame 110 is detachably coupled between the fender wing adapters 120 as a three-component type having three individual members. The utility unit 20 comprises three storage units 200, wherein two of the storage units 200 serve as two side storage units detachably coupled at the fender wing adapters 120 respectively while one of the storage units 200 serves as a top storage unit detachable coupled at the mid-frame 110.

Figure 17:
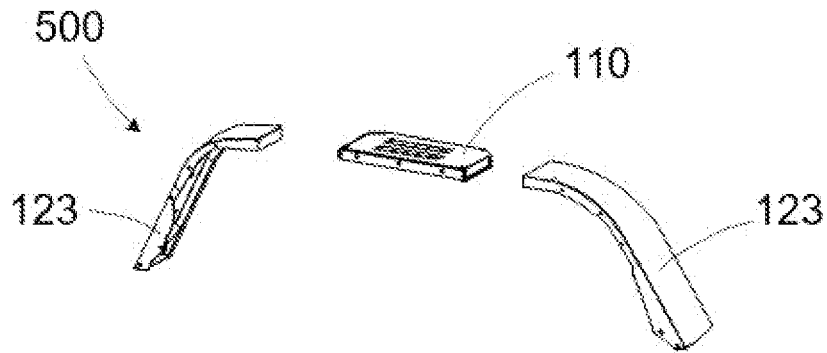
FIG. 17 is an exploded perspective view illustrating a three-component type barebone frame of the fender frame according to the preferred embodiment of the present invention.

Particularly, the barebone frame 500 is constructed to have three individual members, wherein the mid-frame 110 is detachably coupled between two base wing frames 123, as shown in FIG. 17. Two ends of the mid-frame 110 are aligned with two inner ends of two base wing frames 123 respectively.

Figures 1, 18:
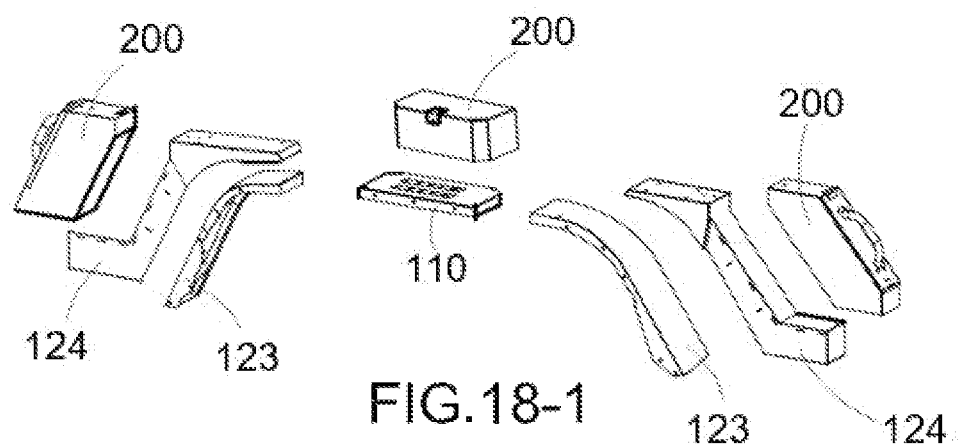
Figures 2, 18:
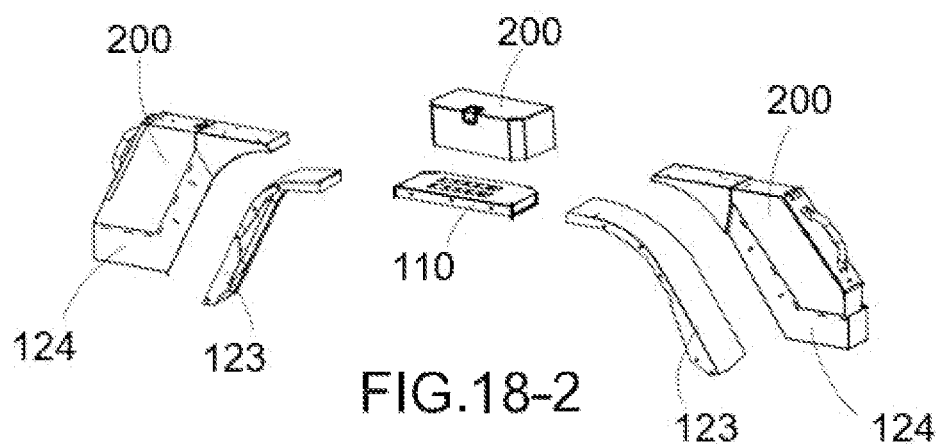
Figures 3, 18:
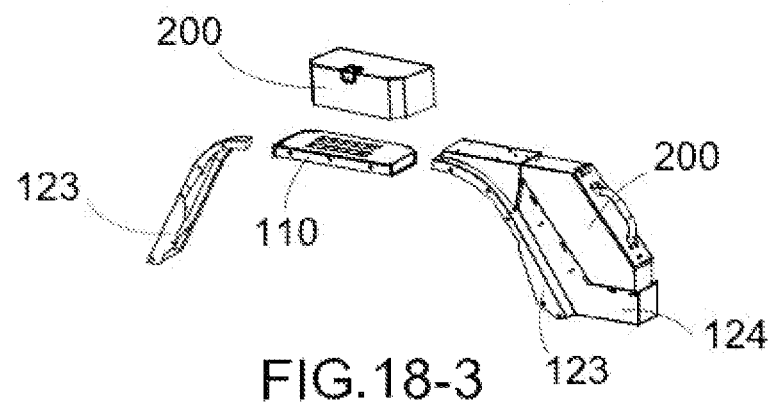
Figures 4, 18:
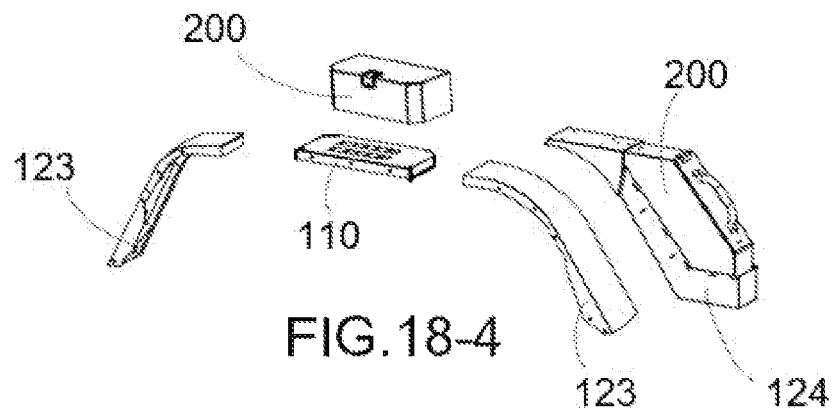
Figures 5, 18:
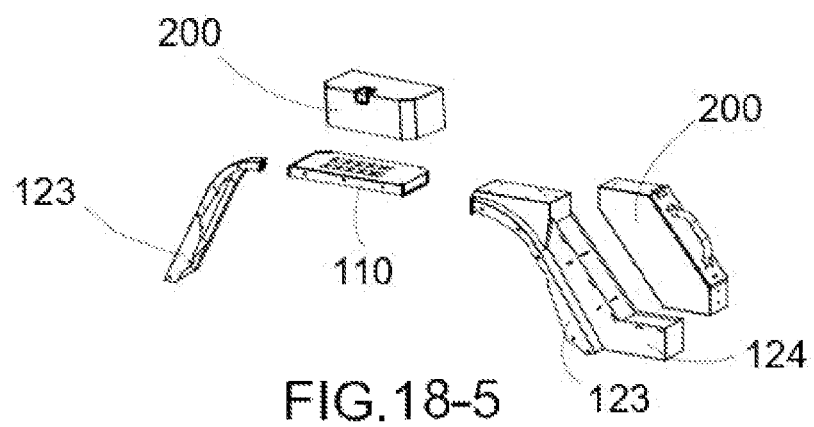
Figures 6, 18:
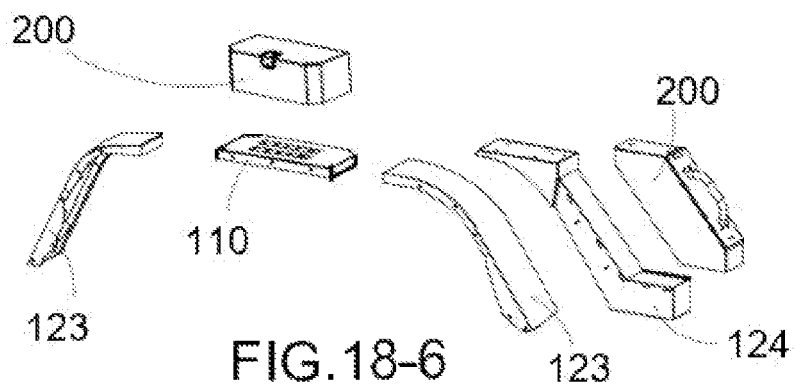
Figures 7, 18:
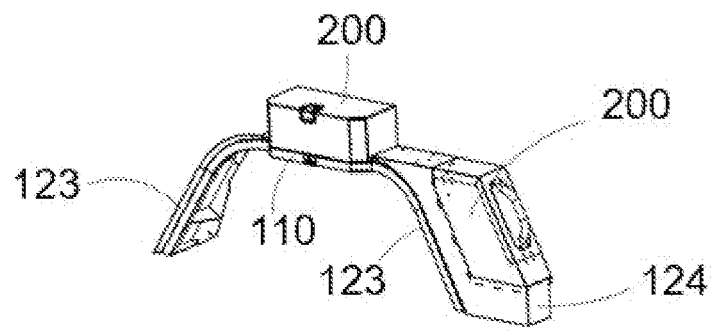
Figures 8, 18:
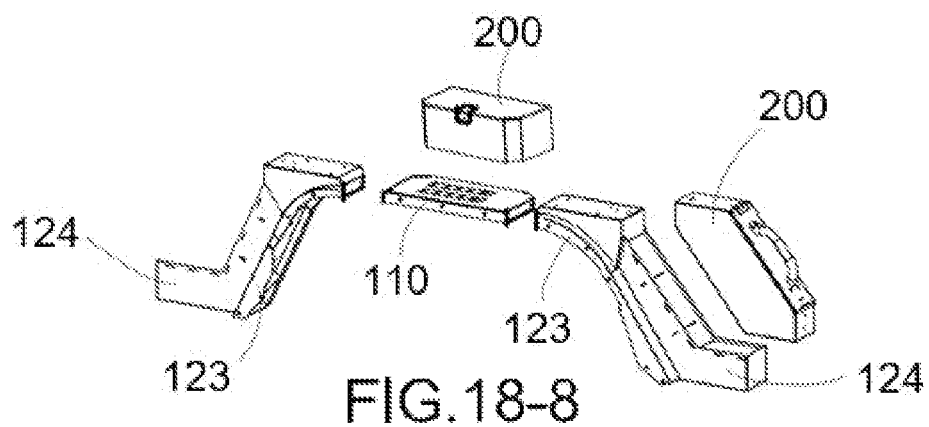
Figures 9, 18:
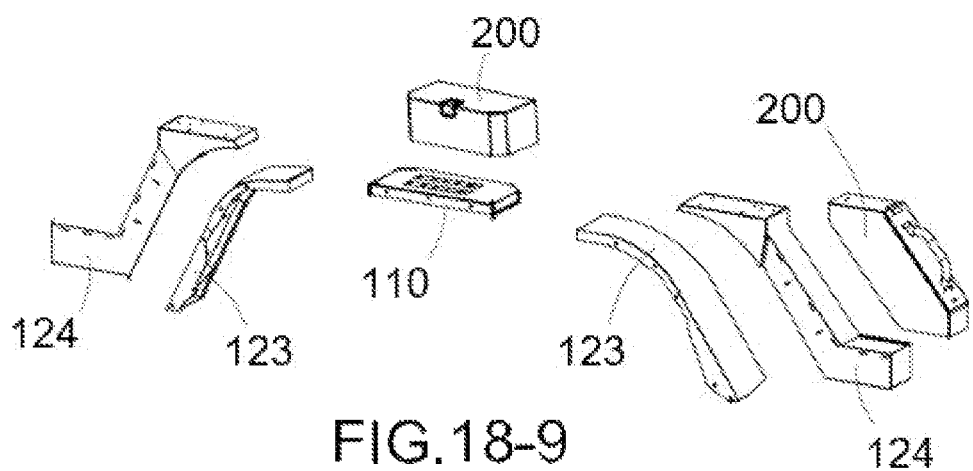
Figures 10, 18:
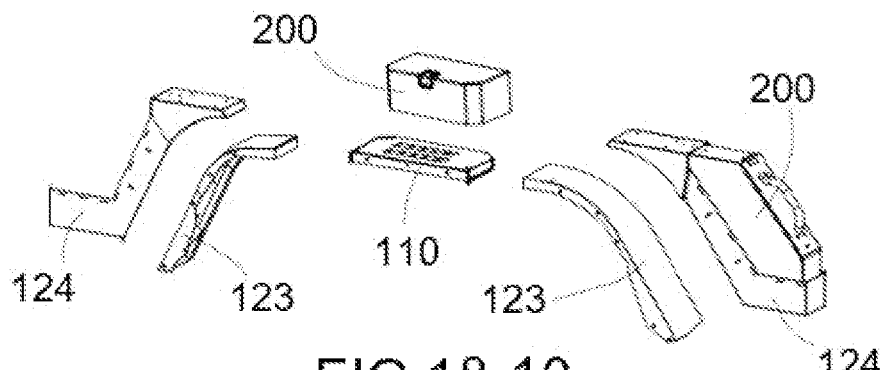
Figures 11, 18:
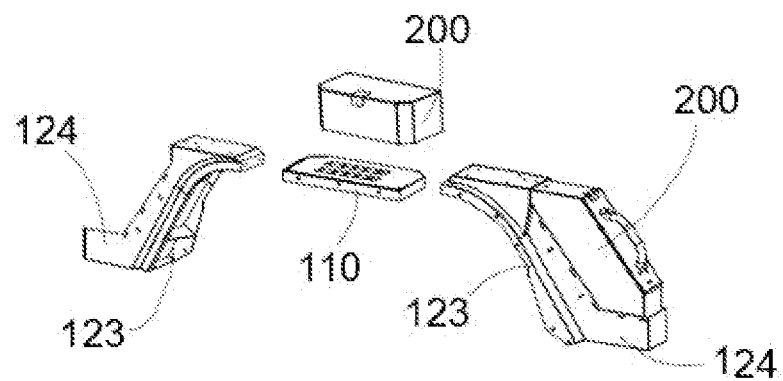
Figures 12, 18:
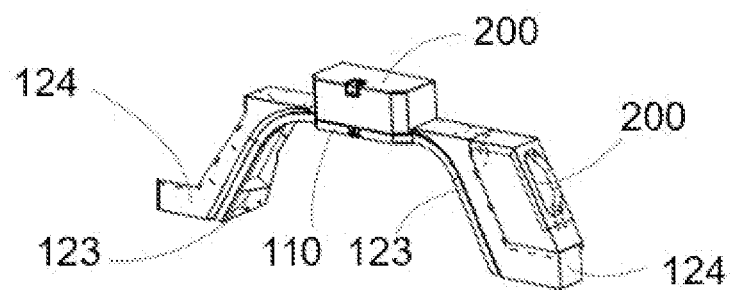
Figures 13, 18:
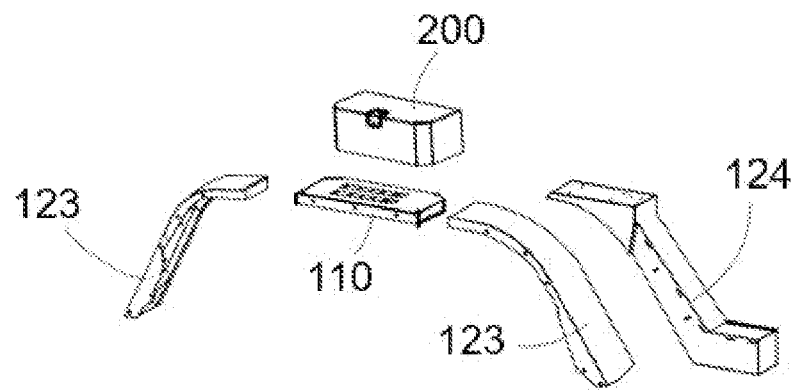
Figures 14, 18:
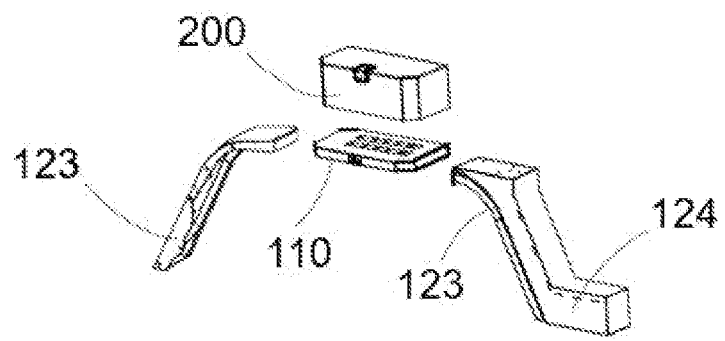
Figures 15, 18:
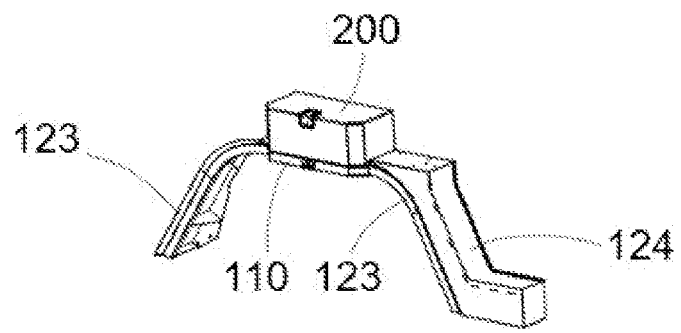
Figures 16, 18:
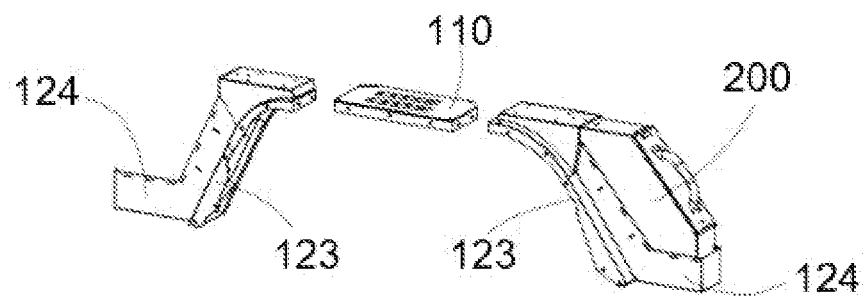
Figures 17, 18:
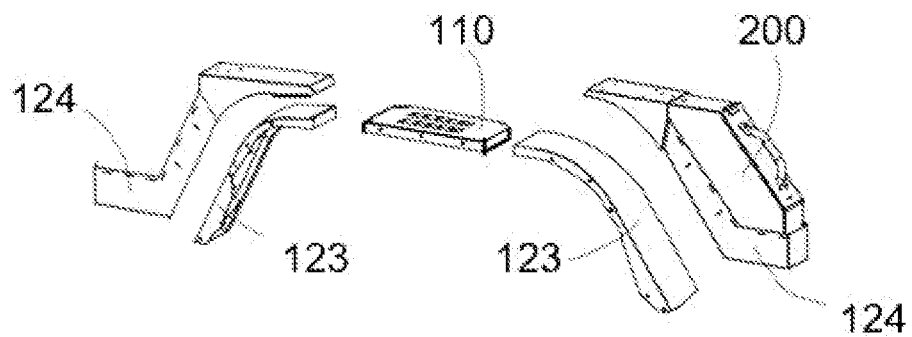
Figure 18:
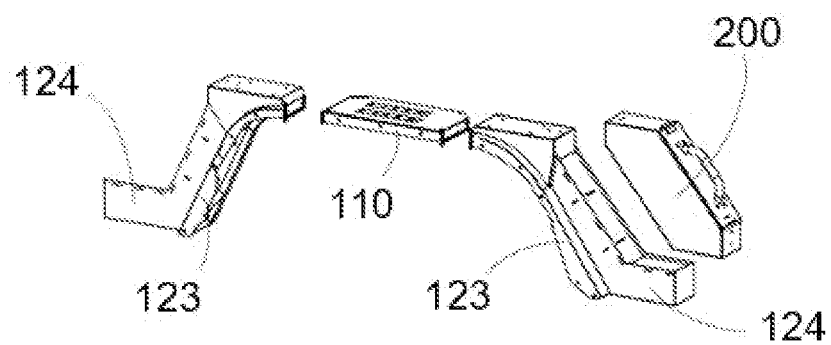
Figures 18, 19:
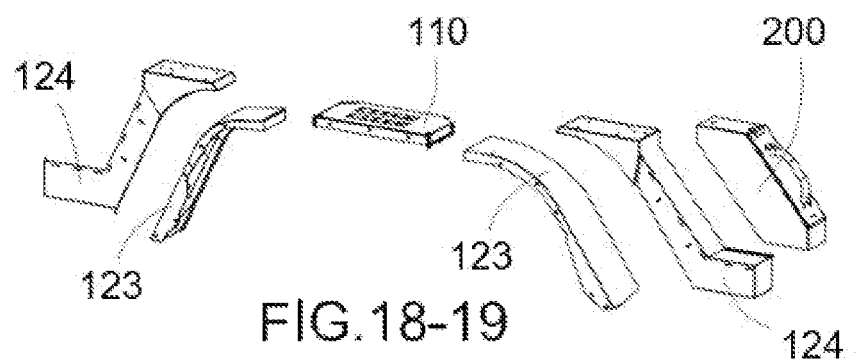
Figures 18, 19, 20:
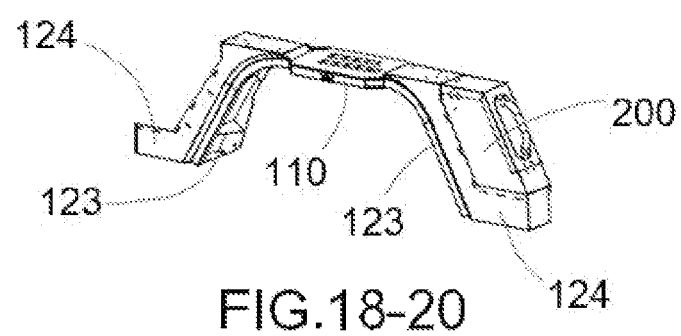

FIGS. 18-1 to 18-32 illustrate different combinations of the fender frame 10 and the utility storage 20. FIG. 18-1 illustrates one mid-frame 110, two base wing frames 123, two unit holders 124, and three utility storages 200 detachably coupled with each other. FIG. 18-2 illustrates one mid-frame 110, two base wing frames 123, two unit holders 124, and three utility storages 200, wherein two of the utility storages 200 are permanently mounted at the unit holders 124 respectively. FIG. 18-3 illustrates one mid-frame 110, two base wing frames 123, one unit holder 124, and two utility storages 200, wherein one of the utility storages 200 is permanently mounted at the unit holder 124 and the unit holder 124 is permanently mounted at one of the base wing frames 123. FIG. 18-4 illustrates one mid-frame 110, two base wing frames 123, one unit holder 124, and two utility storages 200, wherein one of the utility storages 200 is permanently mounted at the unit holder 124 and the unit holder 124 is detachably mounted at one of the base wing frames 123. FIG. 18-5 illustrates one mid-frame 110, two base wing frames 123, one unit holder 124, and two utility storages 200, wherein one of the utility storages 200 is detachably mounted at the unit holder 124 and the unit holder 124 is permanently mounted at one of the base wing frames 123. FIG. 18-6 illustrates one mid-frame 110, two base wing frames 123, one unit holder 124, and two utility storages 200 detachably coupled with each other. FIG. 18-7 illustrates one mid-frame 110, two base wing frames 123, one unit holder 124, and two utility storages 200 integrally formed as a one piece integrated member. FIG. 18-8 illustrates one mid-frame 110, two base wing frames 123, two unit holders 124, and two utility storages 200, wherein the mid-frame 110 is detachably coupled between the base wing frames 123, the unit holders 123 are permanently mounted at the base wing frames 123 respectively, one of the utility storages 200 is detachably coupled at the mid-frame 110, and one of the utility storages 200 is detachably coupled at one of the unit holders 123. FIG. 18-9 illustrates one mid-frame 110, two base wing frames 123, two unit holders 124, and two utility storages 200 detachably coupled with each other. FIG. 18-10 illustrates one mid-frame 110, two base wing frames 123, two unit holders 124, and two utility storages 200, wherein one of the utility storages 200 is permanently mounted at one of the unit holders 124. FIG. 18-11 illustrates one mid-frame 110, two base wing frames 123, two unit holders 124, and two utility storages 200, wherein the unit holders 124 is permanently mounted at the base wing frames 123 respectively, and one of the utility storages 200 is permanently mounted at one of the unit holders 124. FIG. 18-12 illustrates one mid-frame 110, two base wing frames 123, two unit holders 124, and two utility storages 200 permanently coupled to form a one piece integrated member. FIG. 18-13 illustrates one mid-frame 110, two base wing frames 123, one unit holder 124, and one top utility storage 200 detachably coupled with each other. FIG. 18-14 illustrates one mid-frame 110, two base wing frames 123, one unit holder 124, and one top utility storage 200, wherein the unit holder 124 is permanently mounted at one of the base wing frames 123. FIG. 18-15 illustrates one mid-frame 110, two base wing frames 123, one unit holder 124, and one top utility storage 200, wherein the unit holder 124 is permanently mounted at one of the base wing frames 123 and the top utility storage 200 is permanently mounted on the mid-frame 110. FIG. 18-16 illustrates one mid-frame 110, two base wing frames 123, two unit holders 124, and one side utility storage 200, wherein the unit holders 124 are permanently mounted at the base wing frames 123 respectively and the utility storage 200 is permanently mounted at one of the unit holders 124. FIG. 18-17 illustrates one mid-frame 110, two base wing frames 123, two unit holders 124, and one side utility storage 200, wherein the utility storage 200 is permanently mounted at one of the unit holders 124. FIG. 18-18 illustrates one mid-frame 110, two base wing frames 123, two unit holders 124, and one side utility storage 200, wherein the unit holders 124 are permanently mounted at the base wing frames 123 respectively. FIG. 18-19 illustrates one mid-frame 110, two base wing frames 123, two unit holders 124, and one side utility storage 200 detachably coupled with each other. FIG. 18-20 illustrates one mid-frame 110, two base wing frames 123, two unit holders 124, and one side utility storage 200 integrally formed in a one piece integrated member. FIG. 18-21 illustrates one mid-frame 110, two base wing frames 123, and one top utility storage 200 integrally formed in a one piece integrated member. FIG. 18-22 illustrates one mid-frame 110, two base wing frames 123, and one top utility storage 200 detachably coupled with each other. FIG. 18-23 illustrates one mid-frame 110, two base wing frames 123, two unit holders 124, and one top utility storage 200 integrally formed in a one piece integrated member. FIG. 18-24 illustrates one mid-frame 110, two base wing frames 123, two unit holders 124, and one top utility storage 200, wherein the unit holders 124 are permanently mounted at the base wing frames 123 respectively. FIG. 18-25 illustrates one mid-frame 110, two base wing frames 123, two unit holders 124, and one top utility storage 200 detachably coupled with each other. FIG. 18-26 illustrates one mid-frame 110, two base wing frames 123, one unit holder 124, and one side utility storage 200 integrally formed in a one piece integrated member. FIG. 18-27 illustrates one mid-frame 110, two base wing frames 123, one unit holder 124, and one side utility storage 200, wherein the utility storage 200 is permanently mounted at the unit holder 124. FIG. 18-27 illustrates one mid-frame 110, two base wing frames 123, one unit holder 124, and one side utility storage 200, wherein the utility storage 200 is permanently mounted at the unit holder 124 and the unit holder 124 is permanently mounted at one of the base wing frames 123. FIG. 18-29 illustrates one mid-frame 110, two base wing frames 123, one unit holder 124, and one side utility storage 200 detachably coupled with each other. FIG. 18-30 illustrates one mid-frame 110, two base wing frames 123, and two unit holders 124 integrally formed in a one piece integrated member. FIG. 18-31 illustrates one mid-frame 110, two base wing frames 123, and two unit holders 124, wherein the unit holders 124 are permanently mounted at the base wing frames 123 respectively. FIG. 18-32 illustrates one mid-frame 110, two base wing frames 123, and two unit holder 124 detachably coupled with each other.

As shown in FIGS. 1 and 19, the fender frame 10 further comprises an inner attachment rim 103 integrally extended from an inner edge of the sideward extension surface 102 of the fender frame 10 between the inner attachment rim 103 and an outer edge of the sideward extension surface 102, and a plurality of fastener slots 104 spacedly formed at the inner attachment rim 103 for detachably attaching to the vehicle wheel frame via fasteners. Accordingly, the inner attachment rim 103 is integrally extended from an inner edge of the base wing frame 123 of the fender wing adapter 120. Preferably, the inner attachment rim 103 is bent from the inner edge of the base wing frame 123 to have a L-shaped cross section, such that when the inner attachment rim 103 is attached to the vehicle wheel frame, the sideward extension surface 102 is outwardly and sidewardly extended from the vehicle wheel frame so as to perpendicularly extend therefrom.

Accordingly, there are a plurality of screw holes preformed at the vehicle wheel frame to detachably couple the stock wheel fender via the fasteners. In order to install the vehicle wheel fender of the present invention into the vehicle, the user is able to firstly detach the stock wheel fender from the vehicle wheel frame by unscrewing the fasteners. Then, the vehicle wheel fender of the present invention can be mounted to the vehicle wheel frame by placing the inner attachment rim 103 thereon to align the fastener slots 104 with the screw holes of the vehicle wheel frame respectively, wherein the fender frame 10 can be detachably mounted to the vehicle wheel frame by screwing the fasteners through the fastener slots 104 and the screw holes. It is worth mentioning that once the vehicle wheel fender of the present invention is mounted at the vehicle wheel frame, the vehicle wheel fender of the present invention not only creates additional utility spaces for the vehicle but also enhances the reinforcing structure of the vehicle wheel frame.

Figures 18, 19, 20, 21:
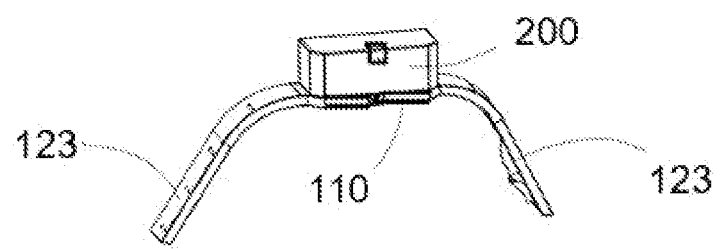
Figures 18, 19, 20, 21, 22:
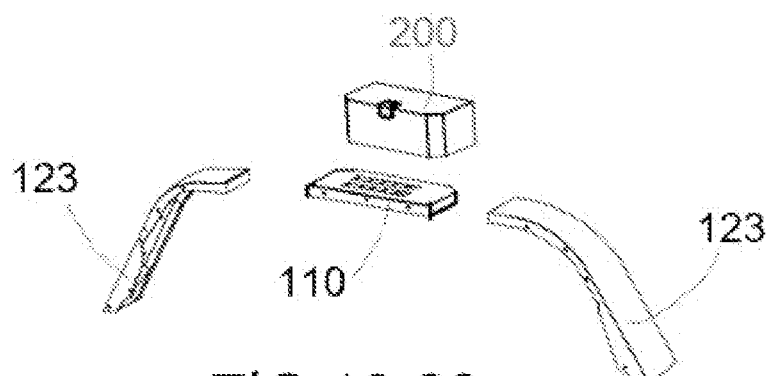

As shown in FIG. 20, the utility storage 200, i.e. the top utility storage, is directly and detachably mounted on the mid-frame 110 of the barebone frame 500. The vehicle wheel fender further comprises a reinforcing holder frame 30 for securing the top utility storage 200. Accordingly, the reinforcing holder frame 30 comprises two holder arms 31 spacedly extended to the top utility storage 200 to hold the utility storage 200 at the vehicle wheel frame of the vehicle above the wheel thereof. Each of the holder arms 31 has a hooking end adapted for hanging at the upper edge of the trunk and a coupling end detachably coupled at the top utility storage 200. It is worth mentioning that the holder arm 31 is long enough to hang the top utility storage 20 below the upper edge of the trunk and sat on the mid-frame 110. It is appreciated that the top utility storage 20 can be directly held by the holder arms 31 to be suspended and supported below the upper edge of the trunk as shown in FIG. 21. It is appreciated that the reinforcing holder frame 30 can be configured to have a plurality of fastener holes 32 spacedly formed on the vehicle wheel frame to detachably couple the utility storage 200 thereat via the fasteners as shown in FIG. 22.

Figures 18, 19, 20, 21, 22, 23:
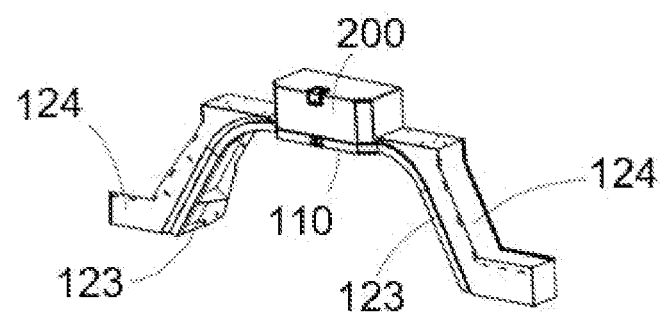

As shown in FIG. 23, the utility storage 200 can be mounted at different locations of the fender frame 10. As it is mentioned above, the utility storage 200 is mounted on the top surface of the fender frame 10. In this alternative as shown in FIG. 23, the utility storage 200 is mounted on the bottom surface of the fender frame 10. Accordingly, two side utility storages 200 are mounted at the bottom surfaces of the base wing frames 123 respectively while the top utility storage 200 is mounted at the bottom surface of the mid-frame 110.

Figures 18, 19, 20, 21, 22, 23, 24:
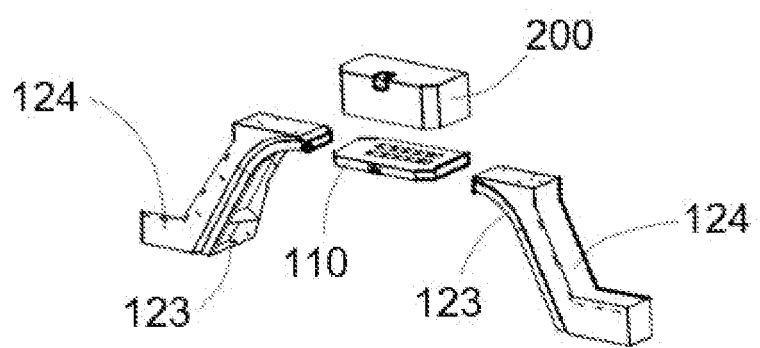

In view of above, it is appreciated that according to the configuration of the function arrangement 1 of the present invention, the fender frame 10 and the utility unit 20 of the function arrangement 1 are capable of providing various combinations to enable the users to compose for specific purposes and applications. Furthermore, FIGS. 24-1 to 24-6 illustrate different combinations of the fender frame 10 and/or the utility storage 20 with the handle frame 410. FIG. 24-1 illustrates one mid-frame 110, two base wing frames 123, and two unit holders 124, one utility storage 200, and one handle frame 410 integrally formed in a one piece integrated member. FIG. 24-2 illustrates one mid-frame 110, two base wing frames 123, two unit holders 124, one utility storage 20, and one handle frame 410 integrally formed in a one piece integrated member. FIG. 24-3 illustrates one mid-frame 110, two base wing frames 123, two unit holders 124, and one handle frame 410, wherein the mid-frame 110 is detachably coupled between the two base wing frames 123, while the handle frame 410 is integrally formed between the two unit holders 124. FIG. 24-4 illustrates one mid-frame 110, two base wing frames 123, two unit holders 124, and one handle frame 410, wherein the mid-frame 110 is integrally formed between the two base wing frames 123, while the handle frame 410 is integrally formed between the two unit holders 124. FIG. 24-5 illustrates one mid-frame 110, two base wing frames 123, two unit holders 124, one utility storage 200, and one handle frame 410, wherein the mid-frame 110 is detachably coupled between the two base wing frames 123, the handle frame 410 is integrally formed between the two unit holders 124, and the utility storage 200 is detachably mounted at one of the unit holders 124. FIG. 24-6 illustrates one mid-frame 110, two base wing frames 123, two unit holders 124, two utility storages 200, and one handle frame 410, wherein the mid-frame 110 is integrally formed between the two base wing frames 123, the handle frame 410 is integrally formed between the two unit holders 124, and the utility storages 200 are detachably mounted at the unit holders 124 respectively.

Figures 18, 19, 20, 21, 22, 23, 24, 25:
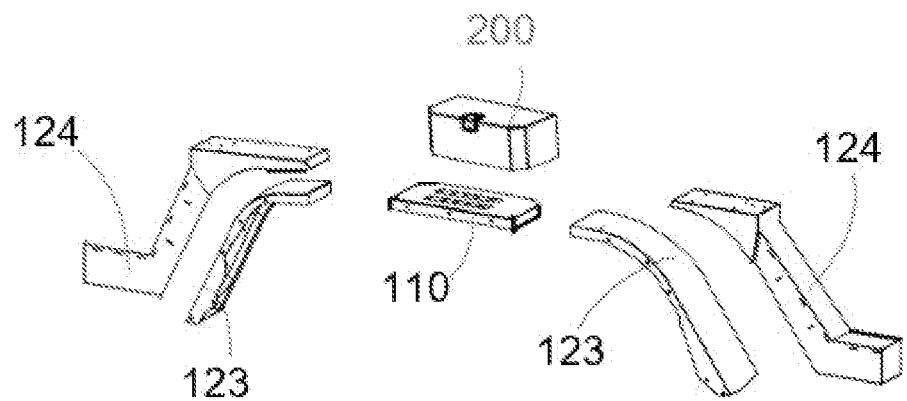

FIGS. 25-1 to 25-4 illustrate the mid-frame 110 provides different functions. Accordingly, the mid-frame 110 comprises a table frame defining a tabletop surface extended between the fender wing adapters 120. As shown in FIG. 25-1, the mid-frame 110 is a one piece table frame having an enlarged tabletop surface having a width larger than a width of each of the fender wing adapters 120. As shown in FIG. 25-2, the mid-frame 110 comprises at least two table portions 1101 foldably coupled with each other, such that the table portions 1101 can be overlapped and folded to minimize the size of the mid-frame 110 and can be unfolded to form the tabletop surface. As shown in FIG. 25-3, the mid-frame 110 comprises at least two table portions 1101 slidably coupled with each other, such that the table portions 1101 can be slid toward each other to overlap with each other so as to minimize the size of the mid-frame 110 and can be slid away from each other so as to form the tabletop surface. As shown in FIG. 25-4, the mid-frame 110 comprises at least two table portions 1101 detachably coupled with each other, such that the table portions 1101 can be detached from each other so as to minimize the size of the mid-frame 110 and can be coupled to each other edge-to-edge so as to form the tabletop surface.

Figures 18, 19, 20, 21, 22, 23, 24, 25, 26:
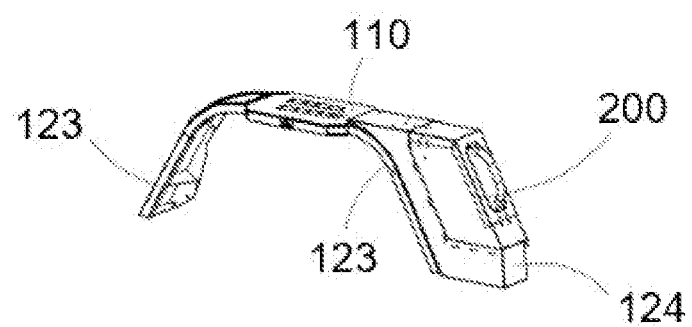

It is worth mentioning that the table frame can be incorporated with different types of fender frame 10. As shown in FIG. 26-1, the table frame 110 is incorporated with the hang type fender frame 10, wherein the fender wing adapter 120 does not have the base supporting portion 122, such that the utility storage 200 is directly mounted at the inclined extension portion 121 of the fender wing adapter 120. As shown in FIG. 26-2, the table frame 110 is incorporated with the support type fender frame 10, wherein the utility storage 200 is supported by the inclined extension portion 121 and the base supporting portion 122 of the fender wing adapter 120. As shown in FIG. 26-3, the table frame 110 is incorporated with the asymmetrical type fender frame 10, wherein the table frame 110 is mounted between the fender wing adapters 120 while the top of the fender wing adapter 120 extended from the rear end of the table frame 110 is located higher than a top the fender wing adapter 120 extended from the front end of the table frame 110.

Figures 18, 19, 20, 21, 22, 23, 24, 25, 26, 27:
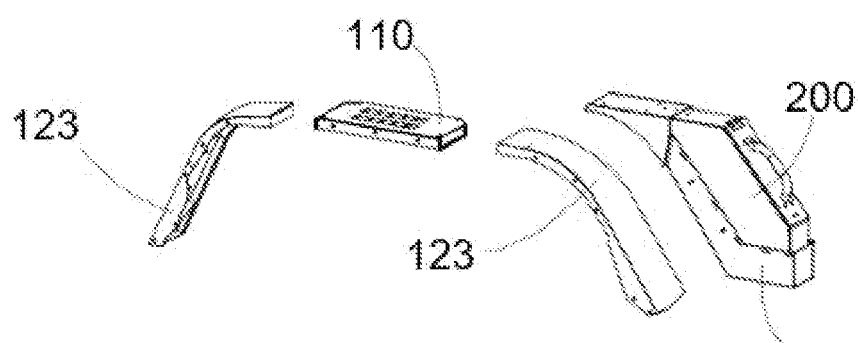

FIG. 27 illustrates a two-component type of the vehicle wheel fender of the present invention, wherein the mid-frame 110 comprises two individual frame portions 111 extended from the fender wing adapters 120 respectively. Accordingly, the frame portions 111 are integrally extended from the fender wing adapters 120 respectively, such that the vehicle wheel fender forms two individual components installed into the vehicle wheel frame of the vehicle.

Figures 18, 19, 20, 21, 22, 23, 24, 25, 26, 27, 28:
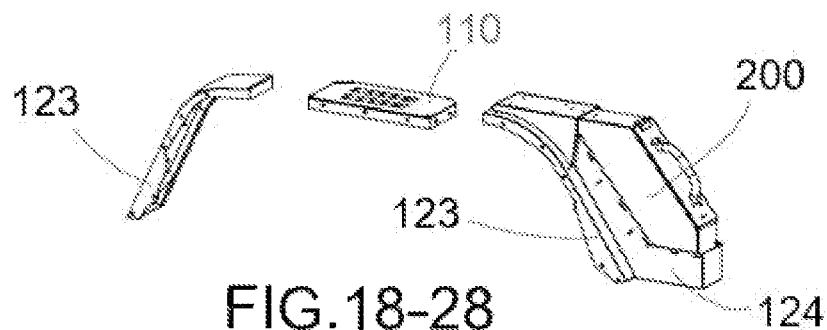

As shown in FIG. 28-1, each of the frame portions 111 has a flat planar configuration, wherein when the frame portions 111 are coupled edge-to-edge, the mid-frame 110 is formed with a flat surface to serve as the step platform or the table frame. As shown in FIG. 28-2, each of the frame portions 111 has a tapered end, wherein when the frame portions 111 are coupled with each other, the tapered ends of the frame portions 111 are aligned and contacted with each other to form the mid-frame 110. As shown in FIG. 28-3, the tapered ends of the frame portions 111 are aligned and coupled with each other via a connector 112 to form the mid-frame 110.

Figures 18, 19, 20, 21, 22, 23, 24, 25, 26, 27, 28, 29:
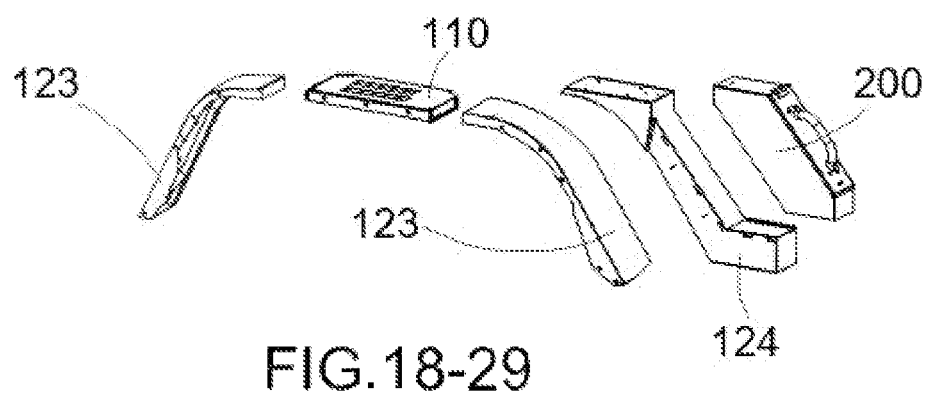

The vehicle wheel fender of the present invention also provides a single-component type. As shown in FIG. 29-1, one single fender wing adapter 120 is attached to the vehicle wheel frame, wherein the utility storage 200 is detachably mounted at the fender wing adapter 120. The fender wing adapter 120 has the inclined extension portion 121 and the base supporting portion 122 to support the utility storage 200. As shown in FIG. 29-2, one single fender wing adapter 120 is attached to the vehicle wheel frame, wherein the utility storage 200 is integrally mounted at the fender wing adapter 120 and the mid-frame 110 is integrally extended from the fender wing adapter 120. The fender wing adapter 120 has the inclined extension portion 121 and the base supporting portion 122 to support the utility storage 200. As shown in FIG. 29-3, one single fender wing adapter 120 is attached to the vehicle wheel frame, wherein the utility storage 200 is detachably hung at the fender wing adapter 120 which only have the inclined extension portion 121 and does not have the base supporting portion 122. As shown in FIG. 29-4, one single fender wing adapter 120 is attached to the vehicle wheel frame, wherein the side utility storage 200 is integrally mounted at the fender wing adapter 120, the mid-frame 110 is integrally extended from the fender wing adapter 120, and the top utility storage 200 is integrally mounted on the mid-frame 110. It is worth mentioning that the side utility storage 200 is integrally mounted at the fender wing adapter 120 having the inclined extension portion 121 and the base supporting portion 122 to support the side utility storage 200. As shown in FIG. 29-5, one single base wing frame 123 is attached to the vehicle wheel frame, wherein the unit holder 124 is detachably mounted at the base wing frame 123 while the utility storage 200 is detachably mounted at the unit holder 124. The unit holder 124 has the inclined extension portion 121 and the base supporting portion 122 to support the utility storage 200. As shown in FIG. 29-6, one single fender wing adapter 120 is attached to the vehicle wheel frame, wherein the side utility storage 200 is integrally mounted at the fender wing adapter 120, and the mid-frame 110 is integrally extended from the fender wing adapter 120. The fender wing adapter 120 only has the inclined extension portion 121 to support the utility storage 200. As shown in FIG. 29-7, one single fender wing adapter 120 is attached to the vehicle wheel frame, wherein the side utility storage 200 is integrally mounted at the fender wing adapter 120, the mid-frame 110 is integrally extended from the fender wing adapter 120, and the top utility storage 200 is integrally mounted on the mid-frame 110. It is worth mentioning that the side utility storage 200 is integrally mounted at the fender wing adapter 120 having the inclined extension portion 121 to support the side utility storage 200, wherein the fender wing adapter 120 does not have the base supporting portion 122. As shown in FIG. 29-8, one single base wing frame 123 is attached to the vehicle wheel frame, wherein the unit holder 124 is detachably mounted at the base wing frame 123 while the utility storage 200 is detachably mounted at the unit holder 124. It is worth mentioning that the side utility storage 200 is hung at the unit holder 124 having the inclined extension portion 121 to support the side utility storage 200, wherein the unit holder 124 does not have the base supporting portion 122. As shown in FIG. 29-9, one single mid-frame 110 is attached to the vehicle wheel frame, wherein the utility storage 200 is detachably coupled on the mid-frame 110. As shown in FIG. 29-10, one single mid-frame 110 is attached to the vehicle wheel frame, wherein the utility storage 200 is integrally formed on the mid-frame 110. As shown in FIG. 29-11, one single barebone frame 500 is attached to the vehicle wheel frame, wherein the utility storage 200 is detachably coupled on the barebone frame 500. As shown in FIG. 29-12, one single mid-frame 110 is attached to the vehicle wheel frame to serve as the table frame. As shown in FIG. 29-13, one single fender wing adapter 120 is attached to the vehicle wheel frame, wherein the mid-frame 110 as the table frame is integrally extended from the fender wing adapter 120 while the side utility storage 200 is integrally mounted at the fender wing adapter 120. The fender wing adapter 120 only has the inclined extension portion 121 to support the utility storage 200. As shown in FIG. 29-14, one single fender wing adapter 120 is attached to the vehicle wheel frame, wherein the mid-frame 110 as the table frame is integrally extended from the fender wing adapter 120 while the side utility storage 200 is detachably mounted at the fender wing adapter 120. The fender wing adapter 120 has the inclined extension portion 121 and the base supporting portion 122 to support the utility storage 200.

Figures 18, 19, 20, 21, 22, 23, 24, 25, 26, 27, 28, 29, 30:
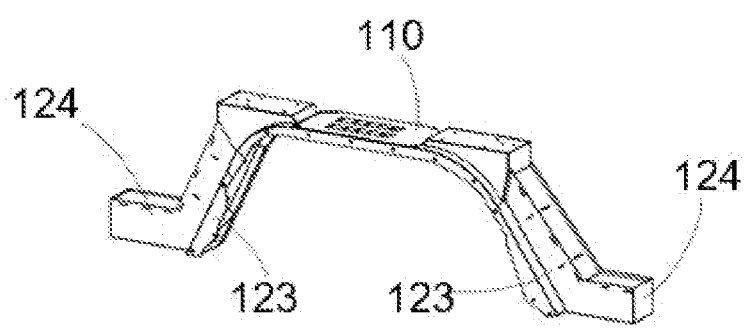
Figures 18, 19, 20, 21, 22, 23, 24, 25, 26, 27, 28, 29, 30, 31:
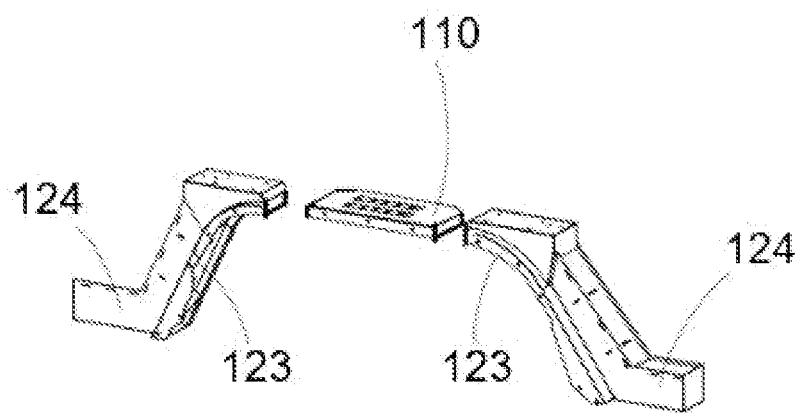
Figures 18, 19, 20, 21, 22, 23, 24, 25, 26, 27, 28, 29, 30, 31, 32:
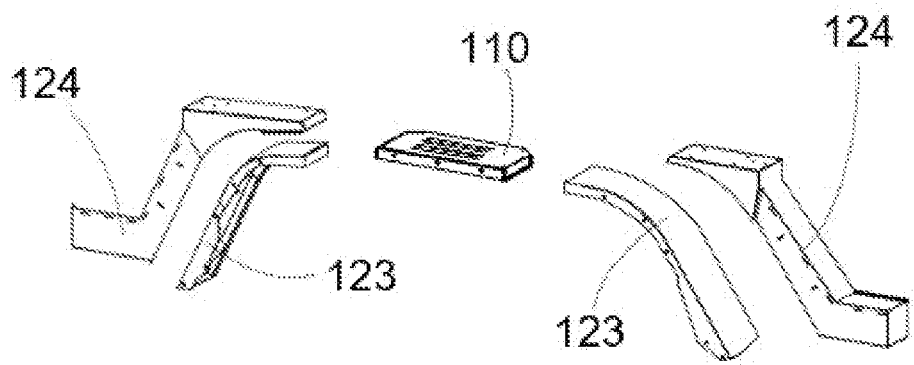
Figure 19:
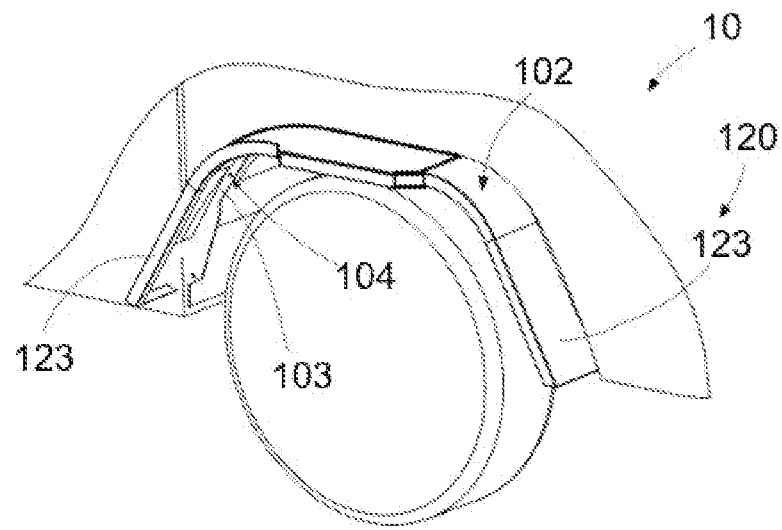
Figure 20:
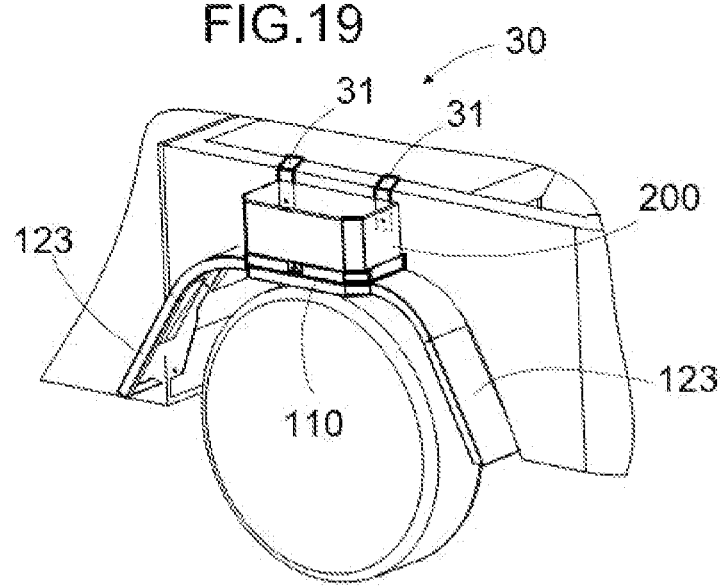
Figure 21:
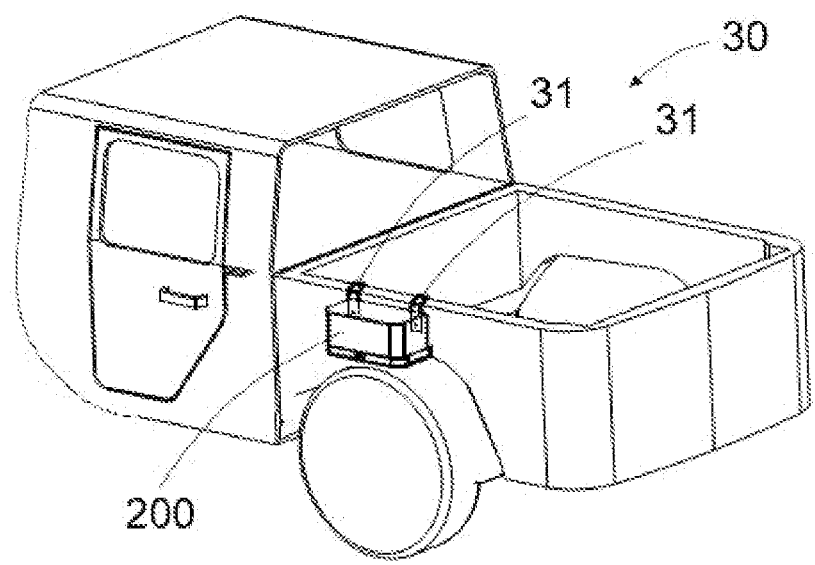
Figure 22:
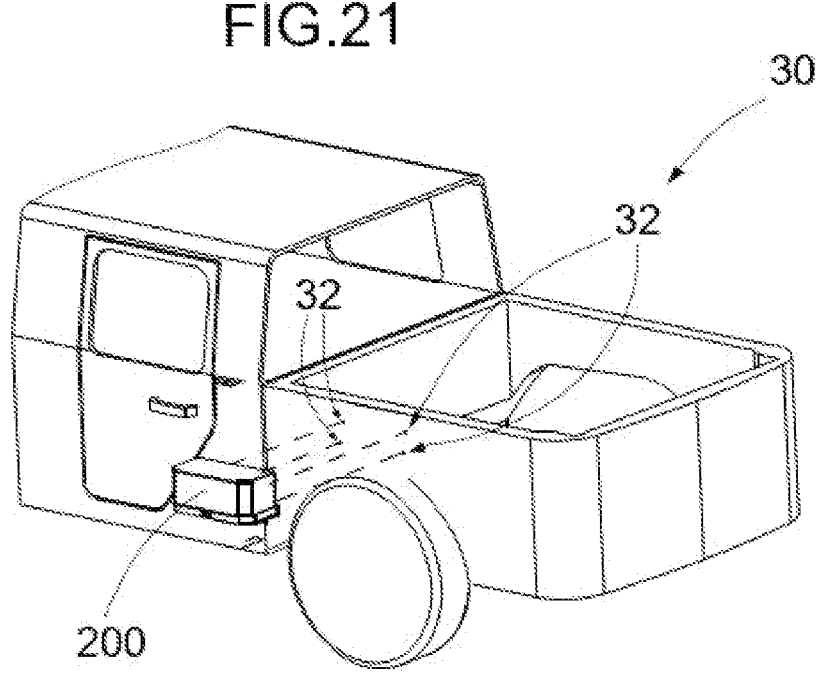
Figure 23:
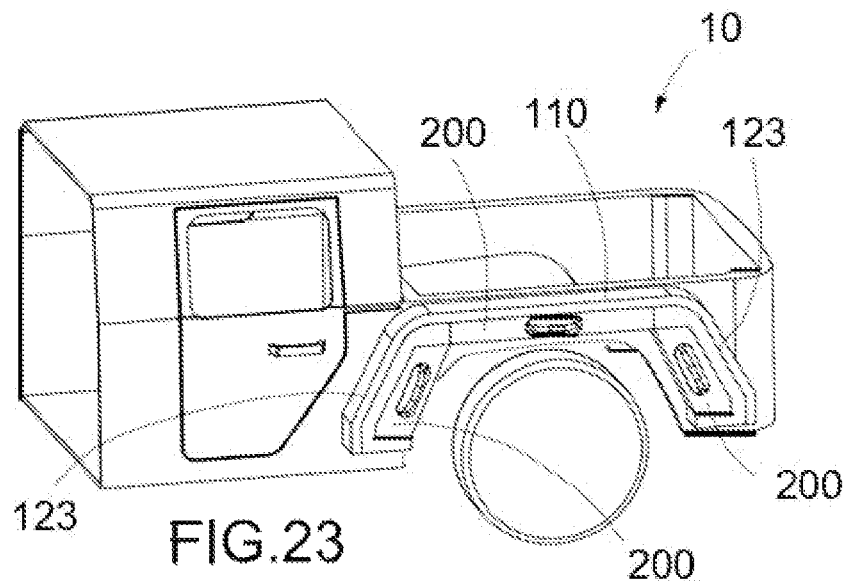
Figures 1, 24:
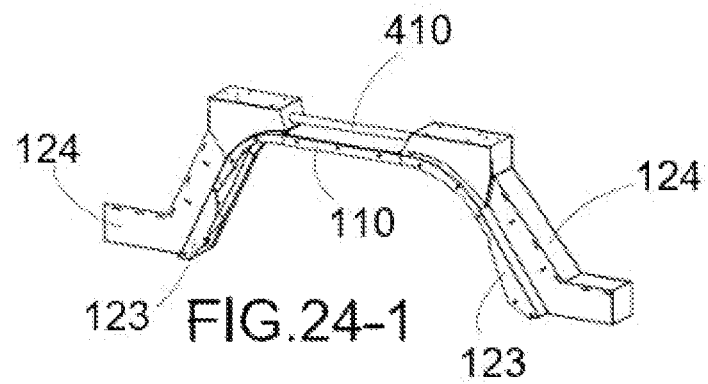
Figures 2, 24:
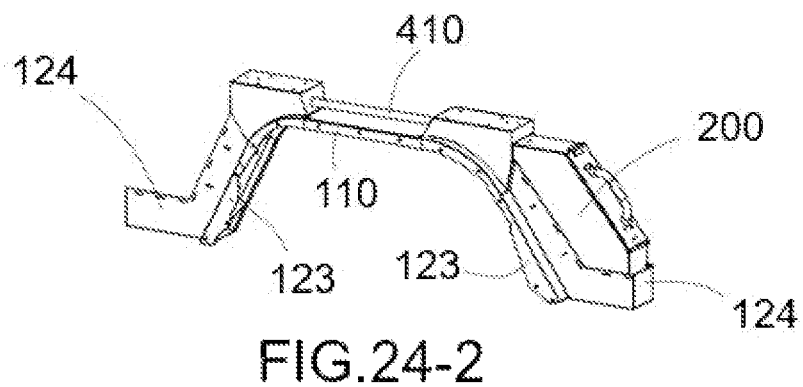
Figures 3, 24:
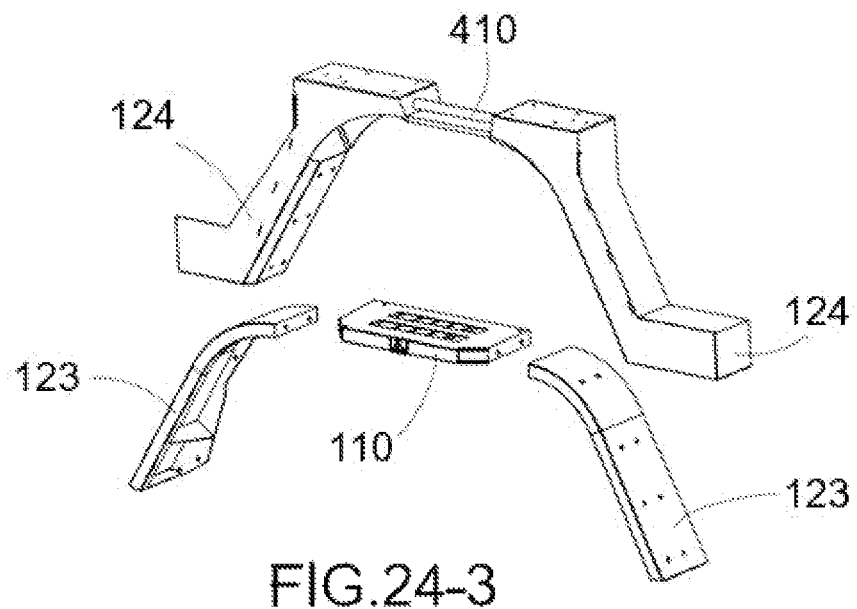
Figures 4, 24:
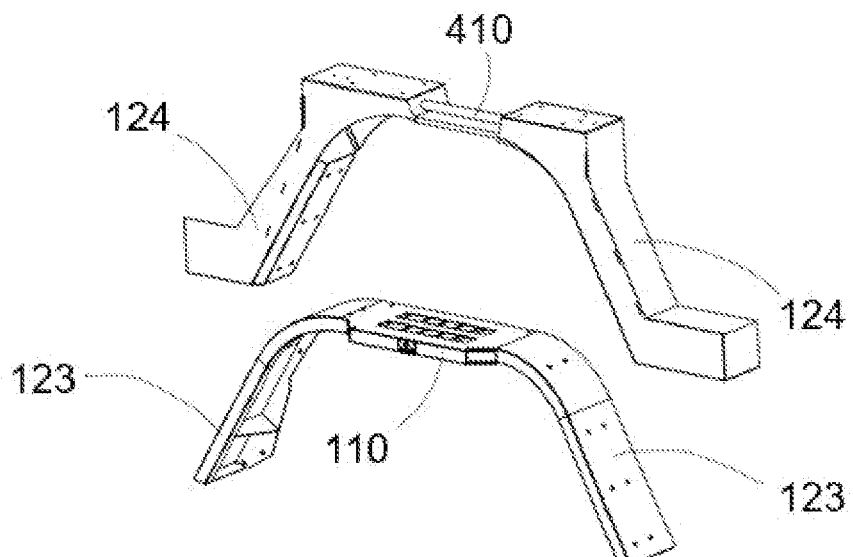
Figures 5, 24:
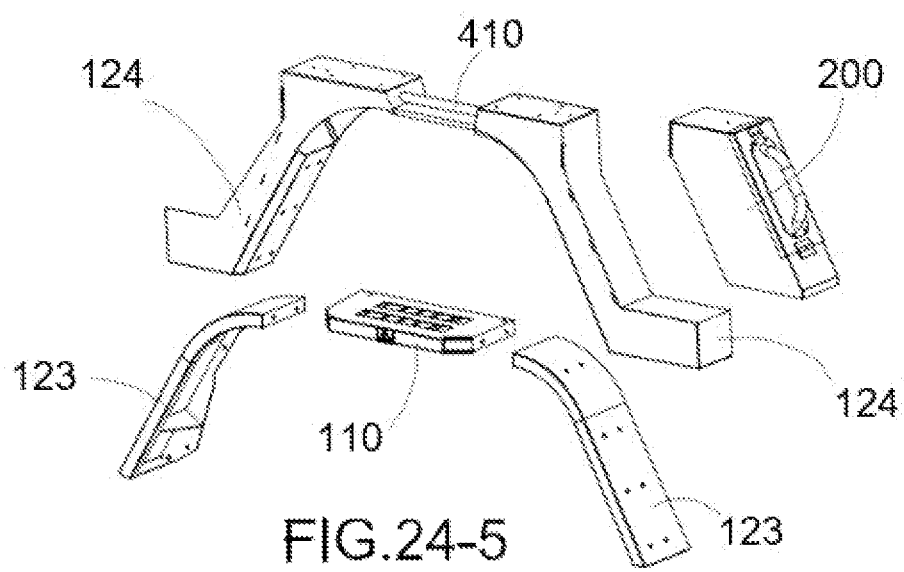
Figures 6, 24:
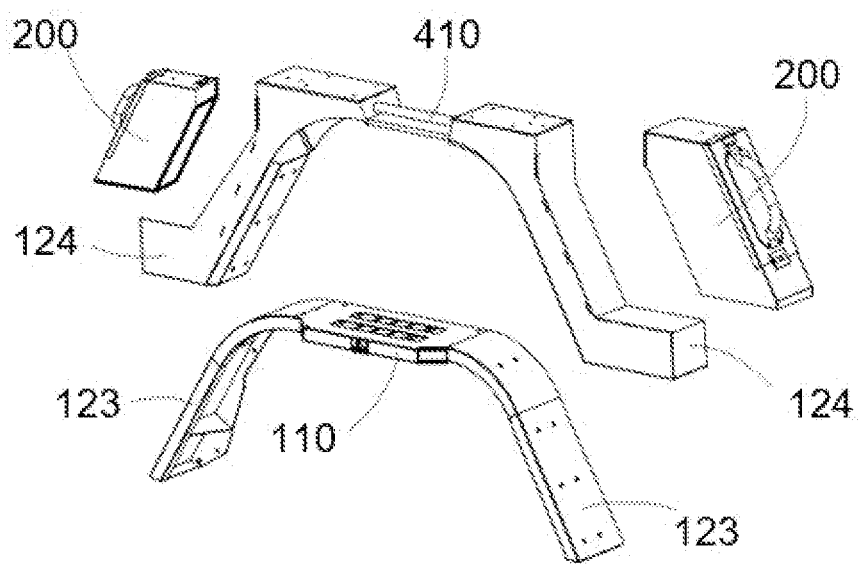
Figures 1, 25:
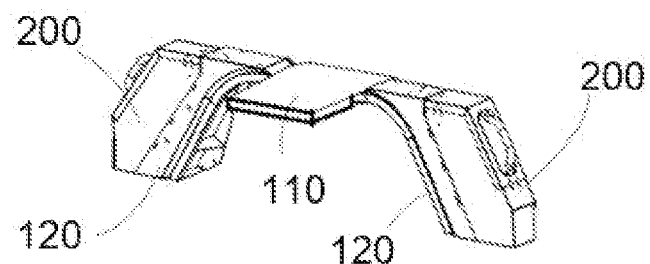
Figures 2, 25:
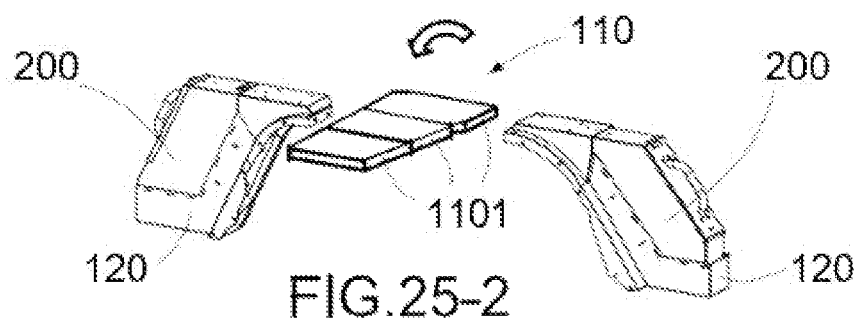
Figures 3, 25:
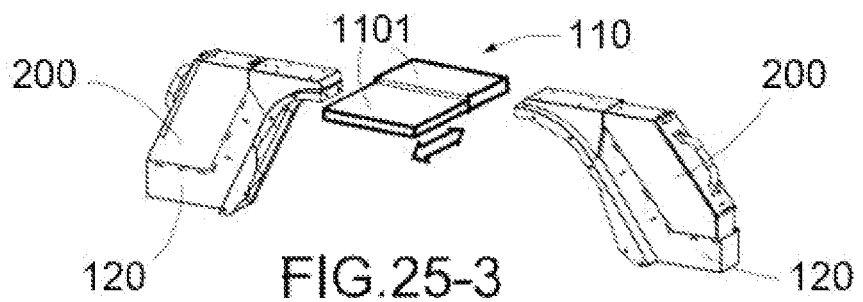
Figures 4, 25:
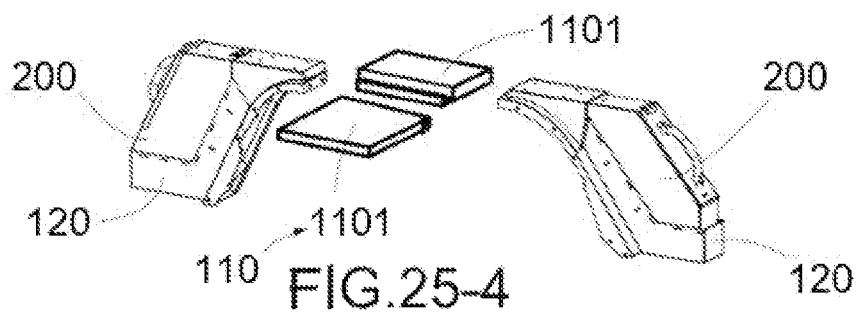
Figures 1, 26:
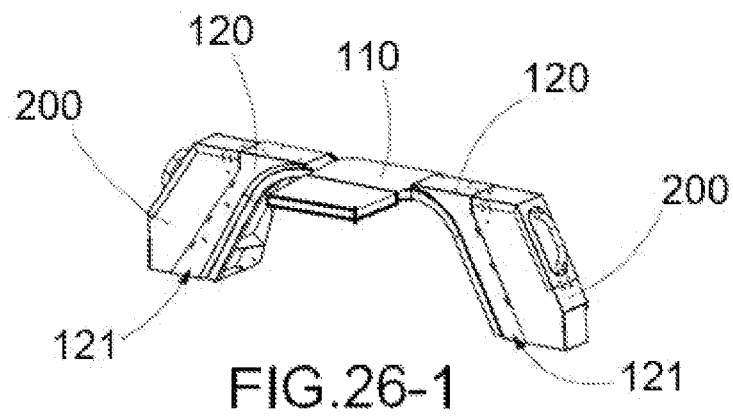
Figures 2, 26:
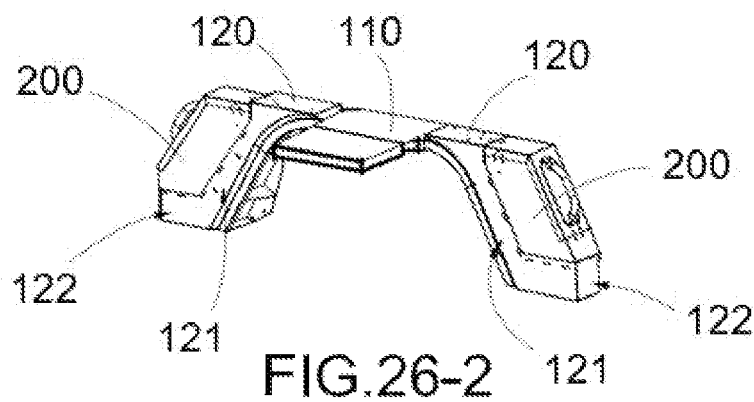
Figures 3, 26:
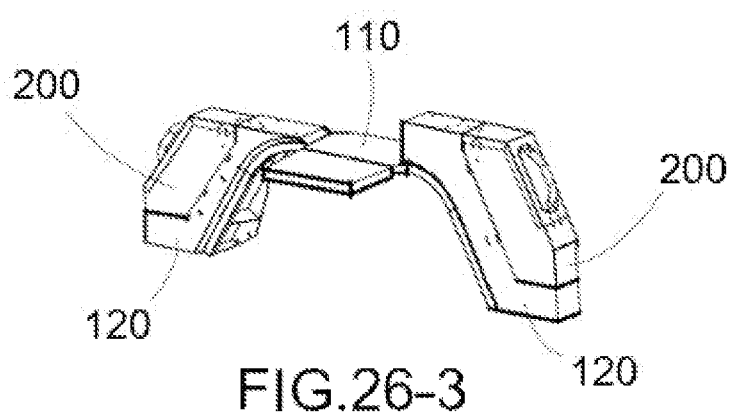
Figure 27:
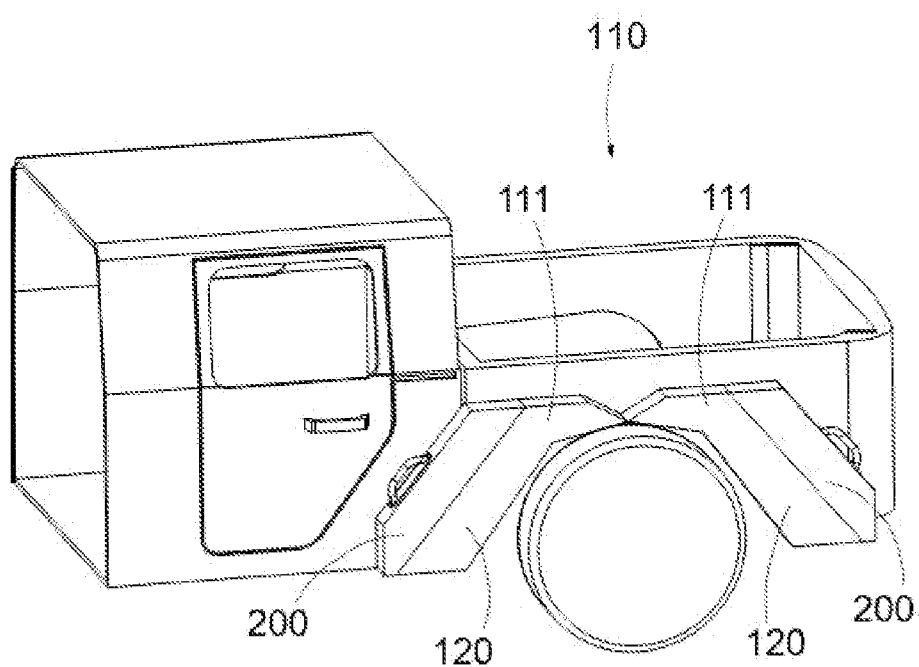
Figures 1, 28:
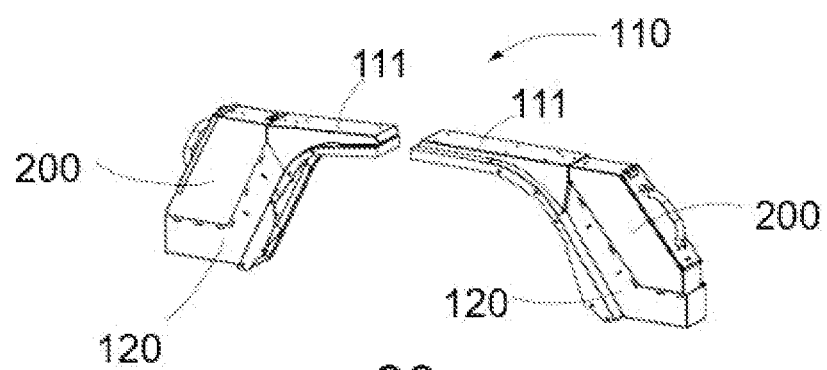
Figures 2, 28:
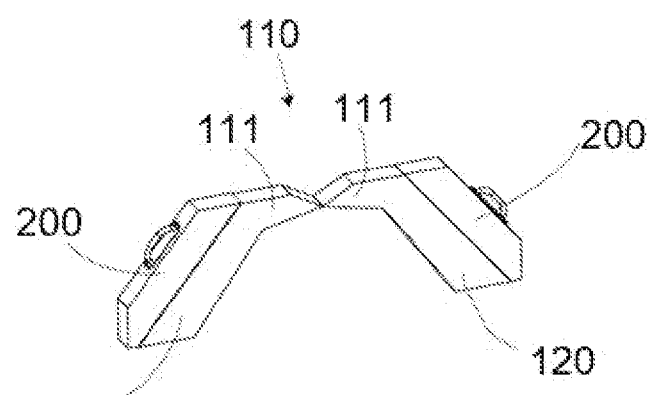
Figures 3, 28:
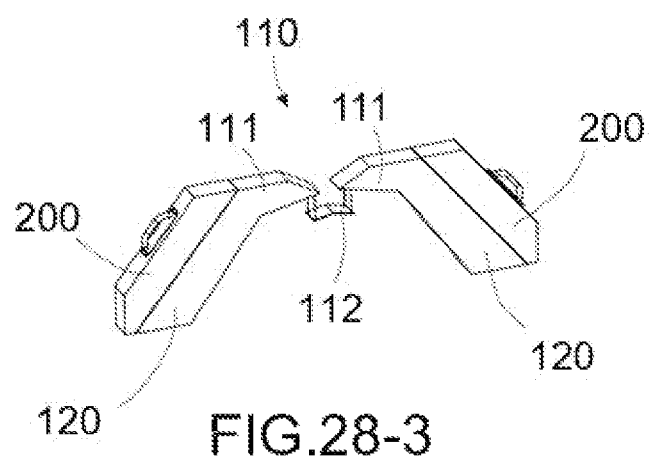
Figures 1, 29:
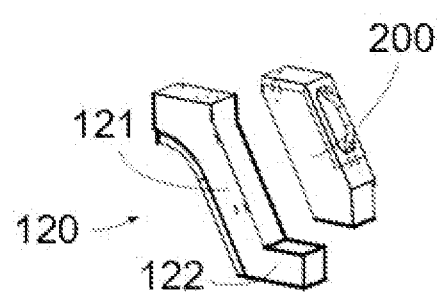
Figures 2, 29:
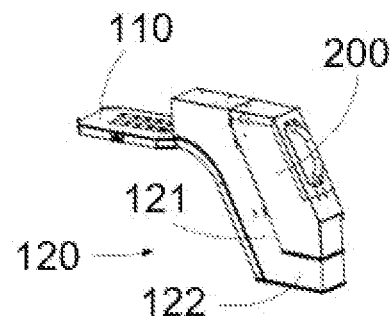
Figures 3, 29:
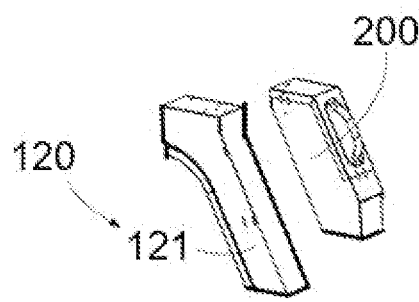
Figures 4, 29:
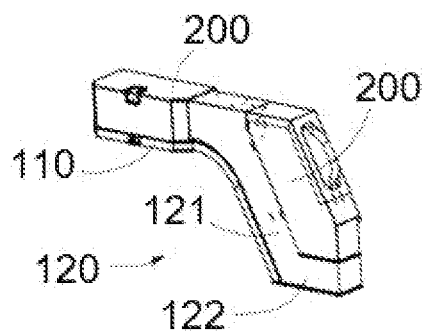
Figures 5, 29:
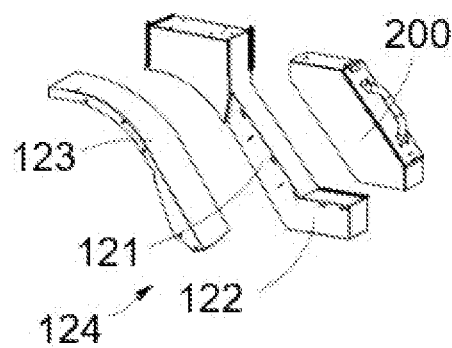
Figures 6, 29:
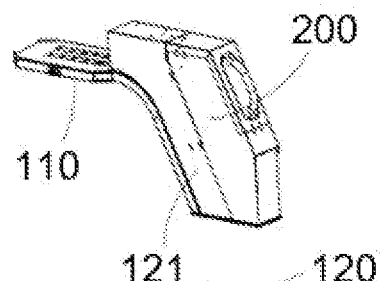
Figures 7, 29:
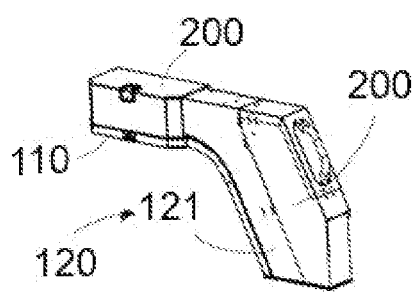
Figures 8, 29:
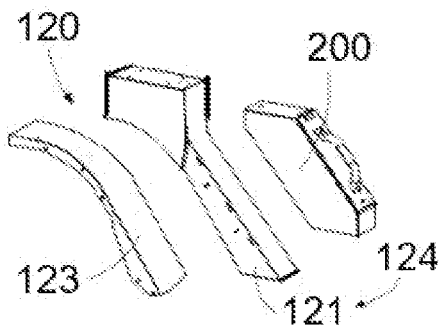
Figures 9, 29:
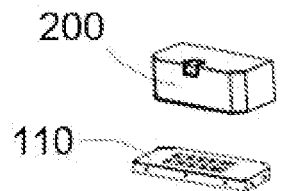
Figures 10, 29:
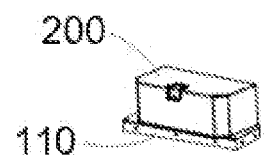
Figures 11, 29:
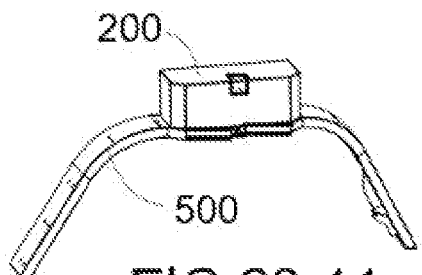
Figures 12, 29:
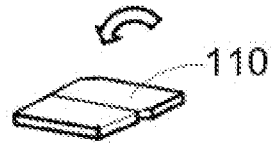
Figures 13, 29:
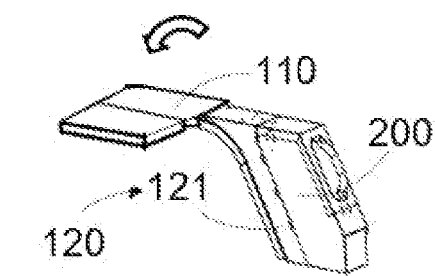
Figures 14, 29:
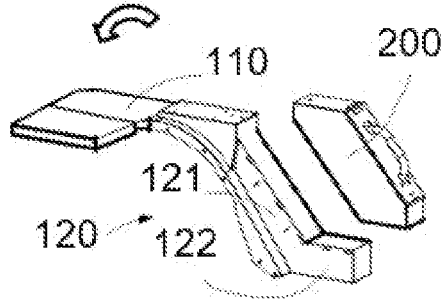
Figure 30:
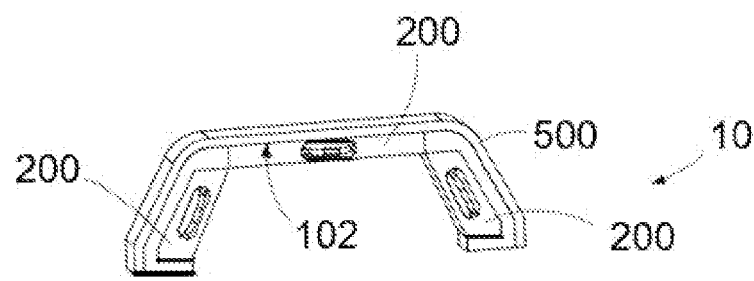
Figure 31:
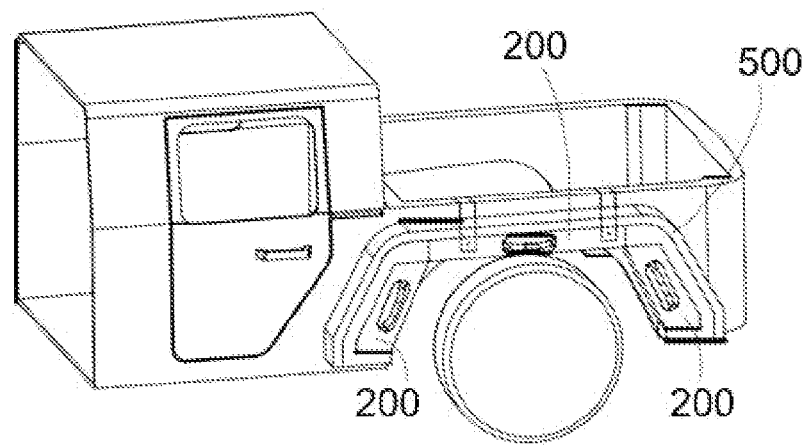
Figure 32:
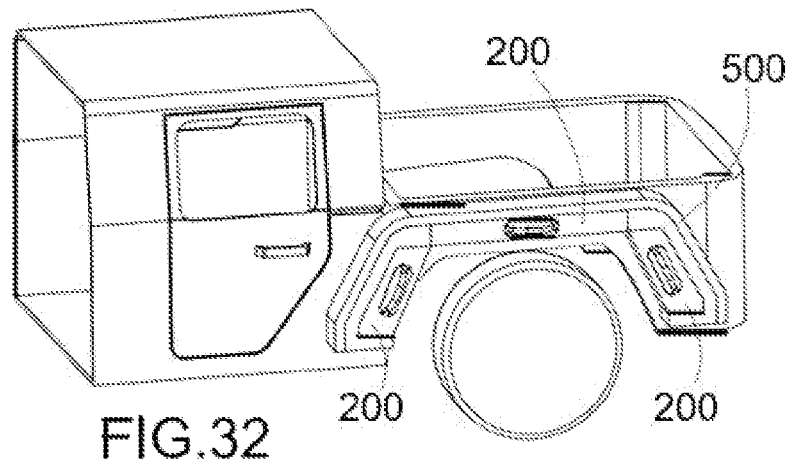

As is it mentioned above, the utility storage 200 can be mounted on the bottom surface of the fender frame 10, such that the side extension surface 102 is defined as the bottom surface of the fender frame 10. As shown in FIGS. 30 and 31, the barebone frame 500 is attached to the vehicle wheel frame, wherein the detachable frame 40 is detachably mounted at the bottom surface of the barebone frame 500, such that two side utility storages 200 are mounted at two bottom side surfaces of the barebone frame 500 respectively while the top utility storage 200 is mounted at the bottom surface of the barebone frame 500. Furthermore, the vehicle wheel fender of the present invention can be installed at a normal installation position as shown in FIG. 31 or at a raised installation position as shown in FIG. 32. At the normal installation position as shown in FIG. 31, the top surface of the barebone frame 500 is located below the upper edge of the trunk. At the raised installation position as shown in FIG. 32, the top surface of the barebone frame 500 is aligned with the upper edge of the trunk at the same level.

Figure 33:
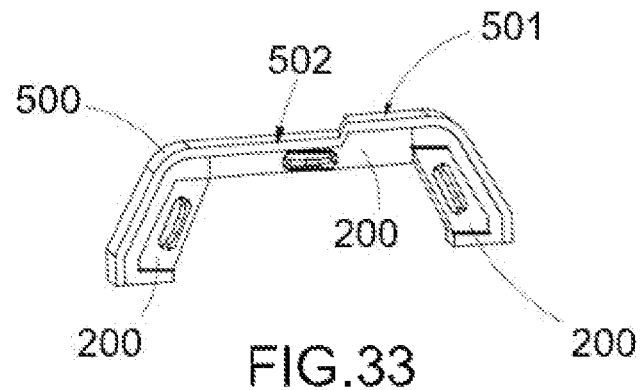
FIG. 33 is a perspective view of another alternative mode of the barebone frame of the vehicle function arrangement according to the preferred embodiment of the present invention, illustrating a top stepping surface of the barebone frame.
Figure 34:
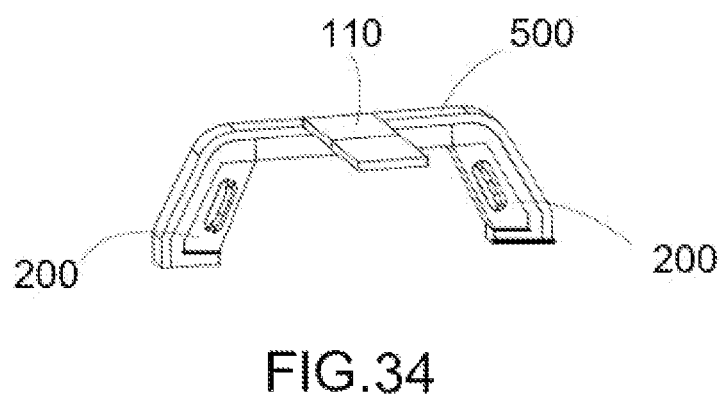
FIG. 34 is a perspective view of another alternative mode of the barebone frame of the vehicle function arrangement according to the preferred embodiment of the present invention, illustrating a table frame formed at the barebone frame.

For further modification as shown in FIG. 33, the barebone frame 500 is configured to have a top stepping surface defining an upper surface portion 501 and a lower surface portion 502 located below the upper surface portion 501. Likewise, the mid-frame 110 serving as the table frame 110 can be formed at the top surface of the barebone frame 500 as shown in FIG. 34, wherein the table frame can incorporate with any one of the foldable structure, slidable structure, and detachable structure.

Figure 35:
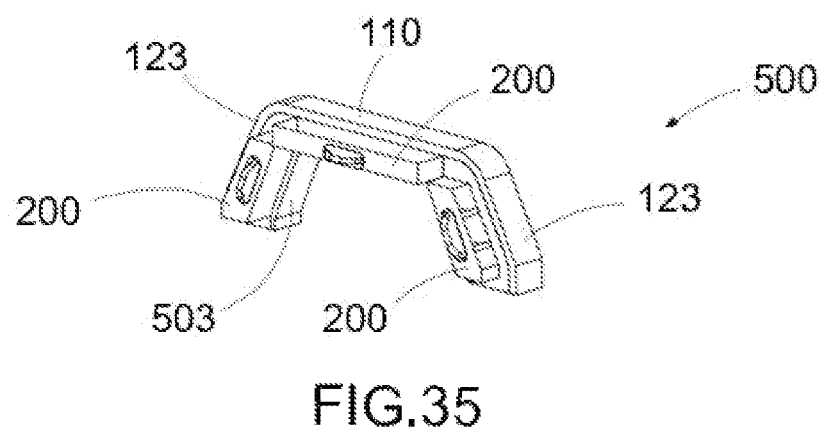
FIG. 35 is a perspective view of another alternative mode of the utility storage module of the vehicle function arrangement according to the preferred embodiment of the present invention, illustrating a drawer of the utility storage module.

As shown in FIG. 35, the utility storage 200 can be constructed as a drawer being slidably coupled to the barebone frame 500. Accordingly, the utility storages 200 are embodied as a top drawer and two side drawers, wherein the top drawer is slidably coupled at the bottom surface of the mid-frame 110 while the two side drawers are slidably coupled at two bottom surfaces of the base wing frames 123 as shown in FIG. 35.

A mud guard 503 is further provided on at least a bottom side of the side drawer.

Figure 36:
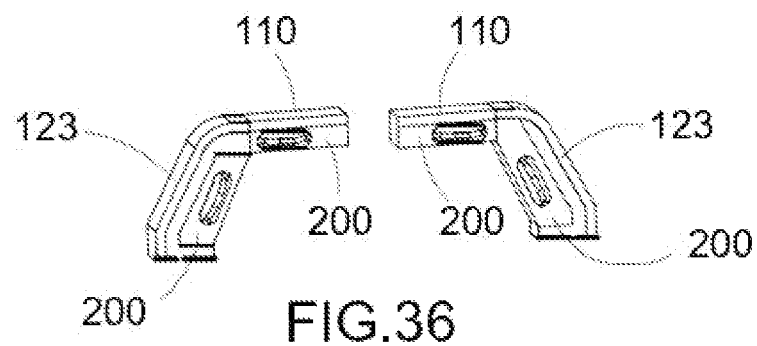
FIG. 36 is a perspective view illustrating a two-component type of the vehicle function arrangement according to the preferred embodiment of the present invention.

In this modification, the vehicle wheel fender can be configured in the two-component type as shown in FIG. 36, wherein the barebone frame 500 is constructed to have two barebone frame portions. Each barebone frame portion comprises one base wing frame 123 and a portion of the mid-frame 110, wherein when the barebone frame portions are coupled end-to-end, two portions of the mid-frames 110 are coupled end-to-end to form the mid-frame 110. Furthermore, two top utility storages 200 as two top drawers are slidably coupled at the bottom surface of two portions of the mid-frames 110 respectively. Two side utility storages 200 as two side drawers are slidably coupled at the bottom surfaces of the base wing frames 123 respectively.

Figures 1, 37:
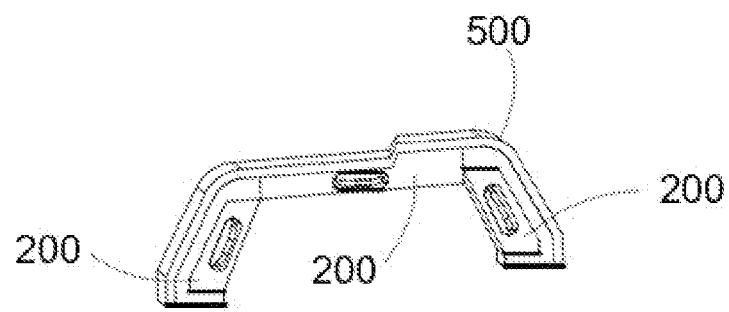
Figures 2, 37:
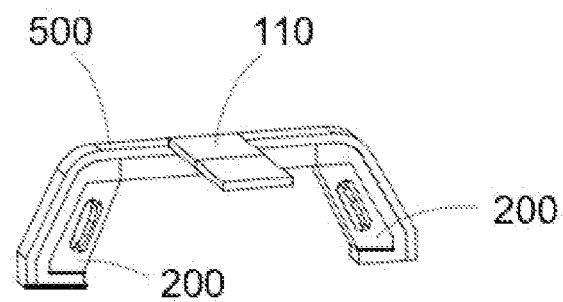
Figures 3, 37:
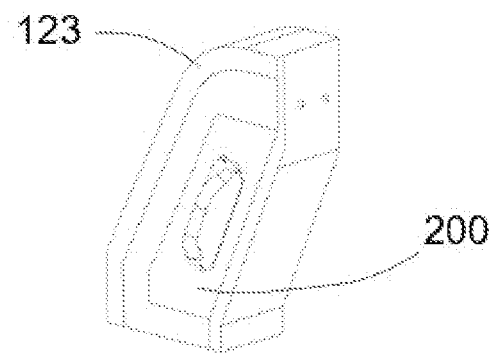
Figures 4, 37:
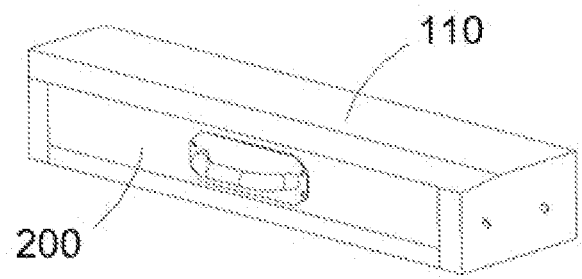
Figures 5, 37:
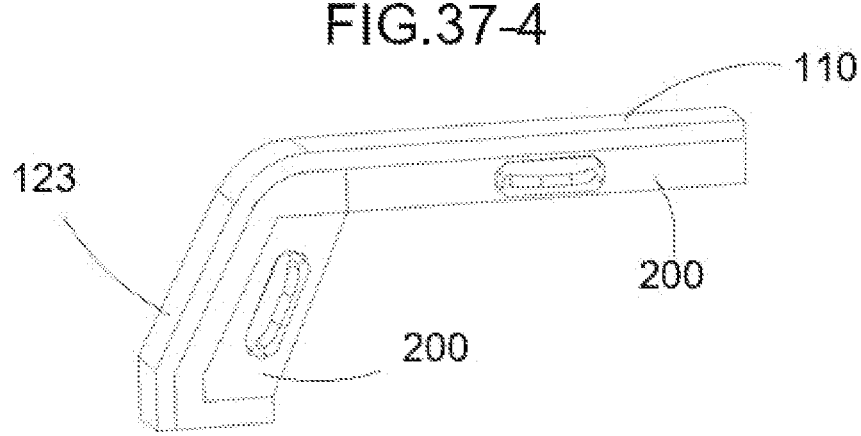

Furthermore, the vehicle wheel fender can be configured in the one-component type. For example, the barebone frame 500 having the top stepping surface is the one-component type as shown in FIG. 37-1. The mid-frame 110 serving as the table frame form with the barebone frame 500 is also the one-component type as shown in FIG. 37-2. FIG. 37-3 illustrates one base wing frame 123 and one side utility storage 200 as the side drawer slidably coupled at the bottom surface of the base wing frame 123. FIG. 37-4 illustrates one mid-frame 110 and one top utility storage 200 as the top drawer slidably coupled at the bottom surface of the mid-frame 110. FIG. 37-5 illustrates one mid-frame 110, one base wing frame 123 integrally extended from the mid-frame 110, and two utility storages 200, wherein one of the utility storages 200 as the side drawer is slidably coupled at the bottom surface of the base wing frame 123 while another utility storage 200 as the top drawer is slidably coupled at the bottom surface of the mid-frame 110.

Figure 38:
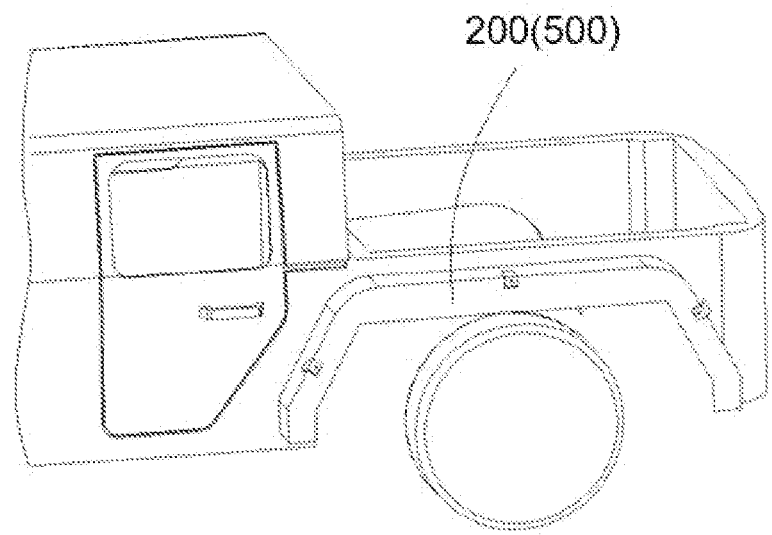
FIG. 38 is a perspective view illustrating the utility storage module served as the single-component type of the barebone frame of the vehicle function arrangement to directly mount at the vehicle wheel frame of the vehicle according to the preferred embodiment of the present invention.
Figure 39:
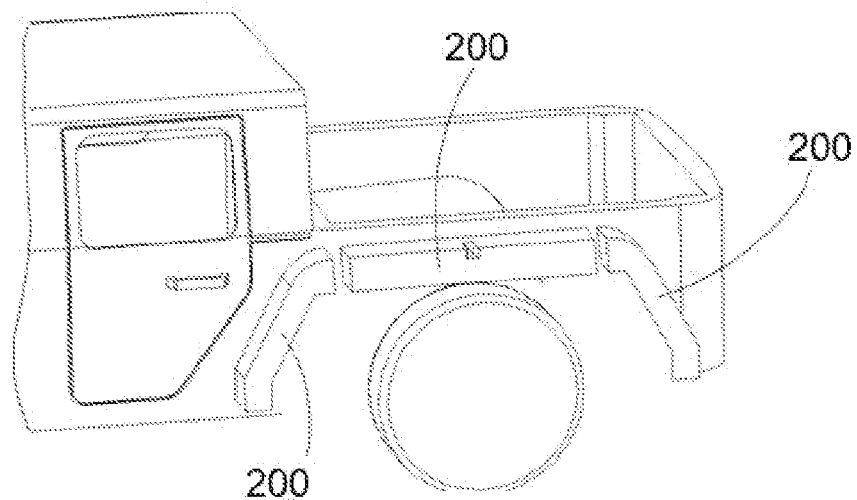
FIG. 39 is a perspective view illustrating the utility storage module served as the three-component type of the barebone frame of the vehicle function arrangement to directly mount at the vehicle wheel frame of the vehicle according to the preferred embodiment of the present invention.

It is worth mentioning that the utility storage 200 can be served as the barebone frame 500 to directly mount at the vehicle wheel frame of the vehicle as shown in FIG. 38, wherein the utility storage 200 has two side wing portions and a mid-portion integrally extended between the side wing portions to form a one-piece integrated member, such that the utility storage 200 is shaped and sized matching with the barebone frame 500. Likewise, the two side wing portions and the mid-portion of the utility storage 200 are three individual components as one top utility storage and two side utility storages directly mounted at the vehicle wheel frame of the vehicle as shown in FIG. 39.

Figures 1, 40:
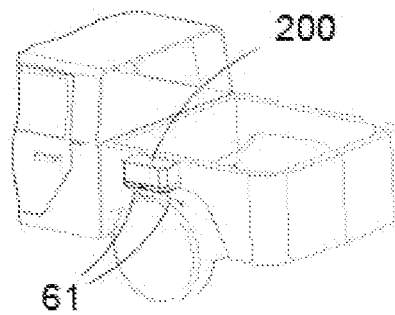
Figures 2, 40:
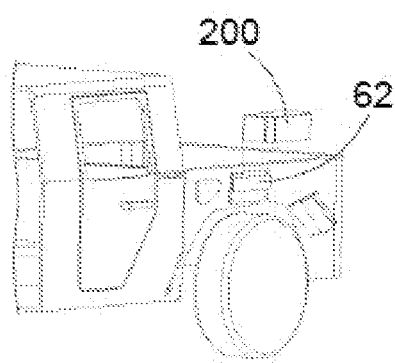
Figures 3, 40:
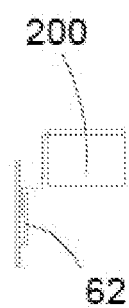
Figures 4, 40:
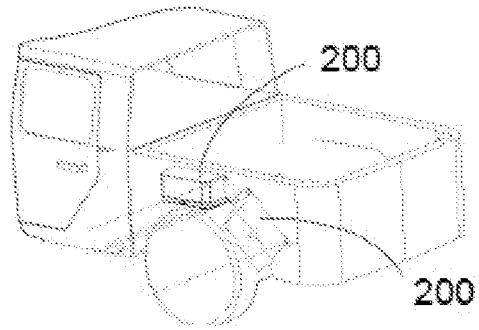

FIGS. 40-1 to 40-4 illustrate alternative installing methods of the vehicle wheel fender of the present invention. FIG. 40-1 illustrates the utility storage 200 is mounted at the vehicle wheel frame of the vehicle via supporters 61, wherein the bottom of the utility storage 200 is supported by the supporters 61. FIGS. 40-2 and 40-3 illustrate the utility storage 200 is mounted at the vehicle wheel frame of the vehicle via an installation base member 62, wherein the installation base member 62 is directly mounted at the vehicle wheel frame. Two clipping members are provided at the installation base member 62 and the utility storage 200 respectively, such that the utility storage 200 is detachably clipped on the installation base member 61 via the clipping members. FIG. 40-4 illustrates the utility storage 200 is directly mounted at the vehicle wheel frame of the vehicle via screws.

The installing method of the vehicle function arrangement 1 to a vehicle comprises the following steps.

(1) Remove the stock wheel fender from the vehicle wheel frame of the vehicle to expose the vehicle wheel frame V1 and installation holes thereof. Particularly, the stock wheel fender is detached from the vehicle wheel frame V1 by unfastening the fasteners from the installation holes (e.g. screw holes) of the vehicle wheel frame V1 of the vehicle V.

(2) Mount the vehicle function arrangement 1 of the present invention to the vehicle wheel frame V1 of the vehicle V as a replacement of the stock wheel fender, which comprises by the steps of:

(2.1) placing the inner attachment rim 103 of the fender frame 10 at the vehicle wheel frame V1;

(2.2) aligning the fastener slots 104 at the inner attachment rim 130 with the installation holes of the vehicle wheel frame V1; and (2.3) re-fastening the fasteners at the fastener slots 104 and the installation holes to attach the inner attachment rim 103 of the fender frame 10 at the vehicle wheel frame so as to mount the fender frame 10 threat.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vehicle function arrangement for a vehicle, comprising:
a fender frame adapted for mounting to a wheel fender position of the vehicle, wherein said fender frame has at least one sideward extension surface outwardly extending from a vehicle wheel frame and comprises two fender wing adapters opposingly and inclinedly extended from each other, a mid-frame extended between said fender wing adapters to form an inverted U-shaped configuration of said fender frame, a barebone frame having an inner attachment rim integrally extended from an inner edge of said at least one sideward extension surface for attaching to the vehicle wheel frame, and a detachable frame detachably coupled at said barebone frame, wherein each of said fender wing adapters comprises a base wing frame and a unit holder, wherein said mid-frame is integrally extended between said base wing frames to form said barebone frame;

a utility unit provided at said at least one sideward extension surface of said fender frame for creating an additional utility space for the vehicle; and a handle frame integrally extended between said unit holders to form said detachable frame, wherein when said detachable frame is mounted on said barebone frame, said handle frame is located above said mid-frame.

2. The vehicle function arrangement, as recited in claim 1, wherein said utility unit comprises two side utility storages held at said two fender wing adapters of said fender frame respectively.

3. The vehicle function arrangement, as recited in claim 2, wherein said sideward extension surface is formed at a top surface of each of said fender wing adapters, such that said side utility storages mounted at said top surfaces of said fender wing adapters of said fender frame respectively.

4. The vehicle function arrangement, as recited in claim 2, wherein said sideward extension surface is formed at a bottom surface of each of said fender wing adapters, such that said side utility storages are mounted at said bottom surfaces of said fender wing adapters of said fender frame respectively.

5. The vehicle function arrangement, as recited in claim 1, wherein said utility unit comprises two side utility storages detachably coupled at said two unit holders respectively.

6. The vehicle function arrangement, as recited in claim 1, wherein said mid-frame comprises a step platform extended between said fender wing adapters.

7. The vehicle function arrangement, as recited in claim 1, wherein said mid-frame comprises a table frame extended between said fender wings.

8. The vehicle function arrangement, as recited in claim 1, wherein said mid-frame comprises a flat surface extended between said fender wing adapters and a plurality of functional slots formed on said flat surface.

9. The vehicle function arrangement, as recited in claim 1, further comprising at least a light fixing slot provided on at least one of said mid-frame and said fender wing adapters for mounting a light fixture.

10. The vehicle function arrangement, as recited in claim 1, wherein said barebone frame has a top stepping surface defining an upper surface portion and a lower surface portion located below said upper surface portion.

11. The vehicle function arrangement, as recited in claim 1, wherein said mid-frame comprises two individual frame portions integrally extended from said fender wing adapters respectively.

12. The vehicle function arrangement, as recited in claim 1, wherein said utility unit comprises one or more utility storages mounted at said fender frame, wherein said utility storage is a storage selected from the group consisting of a liquid container, a tool box, a storage box, a mini-refrigerator, and a drawer.

13. The vehicle function arrangement, as recited in claim 1, wherein a bottom of one of said fender wing adapters is located higher than a bottom of another said fender wing adapter.

14. The vehicle function arrangement, as recited in claim 1, wherein a top of one of said fender wing adapters is located higher than a top of another said fender wing adapter.

15. The vehicle function arrangement, as recited in claim 1, wherein each of said fender wing adapters has a protruded peripheral edge defining an indented storage seat therewith to retain a portion of a side utility storage in position.

16. The vehicle function arrangement, as recited in claim 1, wherein each of said fender wing adapters has an inclined extension portion and a base supporting portion extended from a bottom end of said inclined extension portion, wherein said utility unit comprises a side utility storage mounted at said fender wing adapter, wherein a side surface of said side utility storage is engaged with said inclined extension portion while a bottom surface of said side utility storage is engaged with said base supporting portion.

17. The vehicle function arrangement, as recited in claim 1, wherein each of said fender wing adapters has an inclined extension portion, wherein said utility unit comprises a side utility storage mounted at said fender wing, wherein a side surface of said side utility storage is directly engaged with said inclined extension portion, such that a bottom surface of said side utility storage is exposed and suspended.

* * * * *